(12) United States Patent
Wagner et al.

(10) Patent No.: US 10,648,697 B2
(45) Date of Patent: May 12, 2020

(54) SYSTEMS AND METHODS FOR DIRECT THERMAL RECEIVERS USING NEAR BLACKBODY CONFIGURATIONS

(71) Applicant: Alliance for Sustainable Energy, LLC, Golden, CO (US)

(72) Inventors: Michael Wagner, Highlands Ranch, CO (US); Zhiwen Ma, Golden, CO (US); Janna Martinek, Lafayette, CO (US); Ty Neises, Broomfield, CO (US); Craig Turchi, Lakewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 139 days.

(21) Appl. No.: 15/911,723

(22) Filed: Mar. 5, 2018

(65) Prior Publication Data

US 2018/0195768 A1 Jul. 12, 2018

Related U.S. Application Data

(63) Continuation of application No. 14/714,030, filed on May 15, 2015, now Pat. No. 9,945,585.

(Continued)

(51) Int. Cl.
*F24S 10/70* (2018.01)
*F24J 2/46* (2006.01)
(Continued)

(52) U.S. Cl.
CPC ............... *F24S 10/72* (2018.05); *F24J 2/46* (2013.01); *F24S 10/70* (2018.05); *F24S 20/20* (2018.05);
(Continued)

(58) Field of Classification Search
None
See application file for complete search history.

(56) References Cited

U.S. PATENT DOCUMENTS 3,971,211 A 7/1976 Wethe et al.
4,030,477 A 6/1977 Smith
(Continued)

FOREIGN PATENT DOCUMENTS

DE 196 32 019 C1 11/1997
EP 0 151 045 A2 8/1985
(Continued)

OTHER PUBLICATIONS

Con-Tech Systems Ltd., "Introduction to Micropile Design 101: Presentation for Arizona Ram Jack Seminar", Jan. 15, 2010, pp. 1-80.

(Continued)

*Primary Examiner* — Jason Lau
(74) *Attorney, Agent, or Firm* — Michael A. McIntyre

(57) ABSTRACT

An aspect of the present disclosure is a receiver for receiving radiation from a heliostat array that includes at least one external panel configured to form an internal cavity and an open face. The open face is positioned substantially perpendicular to a longitudinal axis and forms an entrance to the internal cavity. The receiver also includes at least one internal panel positioned within the cavity and aligned substantially parallel to the longitudinal axis, and the at least one internal panel includes at least one channel configured to distribute a heat transfer medium.

10 Claims, 32 Drawing Sheets

Related U.S. Application Data

(60) Provisional application No. 61/993,671, filed on May 15, 2014.

(51) Int. Cl.
 *F24S 20/20* (2018.01)
 *F24S 80/00* (2018.01)
 F24S 20/00 (2018.01)

(52) U.S. Cl.
 CPC ........... *F24S 80/00* (2018.05); *F24S 2020/18* (2018.05); *F24S 2080/05* (2018.05); Y02E 10/41 (2013.01); Y02E 10/44 (2013.01)

(56) References Cited

U.S. PATENT DOCUMENTS

| | | | |
|---|---|---|---|
| 4,047,517 | A | 9/1977 | Arnberg |
| 4,116,222 | A | 9/1978 | Seifried |
| 4,117,829 | A | 10/1978 | Gross et al. |
| 4,118,934 | A | 10/1978 | Brola |
| 4,164,123 | A | 8/1979 | Smith |
| 4,209,236 | A | 6/1980 | Horton et al. |
| 4,215,553 | A | 8/1980 | Poirier et al. |
| 4,287,881 | A | 9/1981 | Palazzetti et al. |
| 4,314,549 | A | 2/1982 | Swanson |
| 4,333,445 | A | 6/1982 | Lee |
| 4,358,930 | A | 11/1982 | Pope et al. |
| 4,582,590 | A | 4/1986 | Qader |
| 5,245,986 | A | 9/1993 | Karni |
| 5,947,114 | A | 9/1999 | Kribus et al. |
| 6,598,398 | B2 | 7/2003 | Viteri et al. |
| 6,622,470 | B2 | 9/2003 | Viteri et al. |
| 6,824,710 | B2 | 11/2004 | Viteri et al. |
| 6,910,335 | B2 | 6/2005 | Viteri et al. |
| 7,211,906 | B2 | 5/2007 | Teets et al. |
| 7,219,677 | B1 | 5/2007 | Jackson |
| 7,331,178 | B2 | 2/2008 | Goldman |
| 7,690,377 | B2 | 4/2010 | Goldman et al. |
| 7,845,172 | B2 | 12/2010 | Goldman |
| 7,954,321 | B2 | 6/2011 | Shinnar |
| 7,987,844 | B2 | 8/2011 | Zillmer et al. |
| 8,033,110 | B2 | 10/2011 | Gilon et al. |
| 8,084,280 | B2 | 12/2011 | Kashkoush et al. |
| 8,109,265 | B1 | 2/2012 | Kolb |
| 8,240,051 | B2 | 8/2012 | Fedock et al. |
| 9,127,857 | B2 | 9/2015 | Albrecht et al. |
| 9,200,622 | B2 | 12/2015 | Sakadjian et al. |
| 2004/0244376 | A1 | 12/2004 | Litwin et al. |
| 2005/0026170 | A1 | 2/2005 | Patti et al. |
| 2007/0157614 | A1 | 7/2007 | Goldman |
| 2008/0000231 | A1 | 1/2008 | Litwin et al. |
| 2009/0038608 | A1 | 2/2009 | Caldwell |
| 2009/0064994 | A1 | 3/2009 | Weatherby et al. |
| 2009/0173337 | A1 | 7/2009 | Tamaura et al. |
| 2009/0194097 | A1 | 8/2009 | Rabinoff |
| 2009/0313995 | A1 | 12/2009 | Zakrzewski |
| 2010/0006087 | A1 | 1/2010 | Gilon et al. |
| 2010/0024421 | A1 | 2/2010 | Litwin et al. |
| 2010/0206300 | A1* | 8/2010 | Shabtay .................. F24S 30/42 126/663 |
| 2010/0252025 | A1 | 10/2010 | Kroizer et al. |
| 2010/0303692 | A1 | 12/2010 | Perkins et al. |
| 2011/0000515 | A1 | 1/2011 | Patwardhan et al. |
| 2011/0067398 | A1 | 3/2011 | Slocum et al. |
| 2011/0067690 | A1 | 3/2011 | Slocum et al. |
| 2011/0100796 | A1 | 5/2011 | Ma et al. |
| 2011/0120669 | A1 | 5/2011 | Hunt |
| 2011/0209475 | A1 | 9/2011 | Jeter et al. |
| 2011/0239651 | A1 | 10/2011 | Aoyama et al. |
| 2011/0259544 | A1 | 10/2011 | Neti et al. |
| 2011/0283700 | A1 | 11/2011 | Zohar et al. |
| 2011/0303269 | A1 | 12/2011 | Kim et al. |
| 2011/0314813 | A1 | 12/2011 | Cafri et al. |
| 2012/0085341 | A1 | 4/2012 | Britland |
| 2012/0216536 | A1 | 8/2012 | Ma et al. |
| 2012/0216537 | A1 | 8/2012 | Fitch |
| 2012/0234311 | A1 | 9/2012 | Johnson et al. |
| 2012/0247134 | A1 | 10/2012 | Gurin |
| 2012/0266867 | A1 | 10/2012 | Citti et al. |
| 2012/0312295 | A1* | 12/2012 | Conley .................. F24S 10/72 126/652 |
| 2013/0118145 | A1 | 5/2013 | Palmer et al. |
| 2013/0118477 | A1 | 5/2013 | Albrecht et al. |
| 2013/0118480 | A1 | 5/2013 | Kraft et al. |
| 2013/0118481 | A1 | 5/2013 | Wasyluk et al. |
| 2013/0192586 | A1 | 8/2013 | Wasyluk et al. |
| 2013/0228163 | A1 | 9/2013 | Wait |
| 2013/0255667 | A1 | 10/2013 | Ma et al. |
| 2013/0257056 | A1 | 10/2013 | Ma |
| 2013/0284163 | A1 | 10/2013 | Flamant et al. |
| 2014/0123646 | A1 | 5/2014 | Muren et al. |
| 2014/0157776 | A1 | 6/2014 | Freund et al. |
| 2014/0298822 | A1 | 10/2014 | Ma |
| 2014/0311479 | A1 | 10/2014 | Maryamchik et al. |
| 2015/0020793 | A1 | 1/2015 | Llorente Folch |
| 2015/0300692 | A1 | 10/2015 | Wasyluk |
| 2015/0316328 | A1 | 11/2015 | Trainham et al. |
| 2015/0330667 | A1 | 11/2015 | Wasyluk |
| 2015/0330668 | A1 | 11/2015 | Wagner et al. |
| 2017/0184326 | A1 | 6/2017 | Ma et al. |

FOREIGN PATENT DOCUMENTS

| | | |
|---|---|---|
| EP | 1 930 587 A2 | 6/2008 |
| EP | 2 653 801 B1 | 6/2014 |
| JP | 2011-017449 | 1/2011 |
| WO | WO 2009/153143 A1 | 12/2009 |
| WO | WO 2010/029411 A2 | 3/2010 |
| WO | WO 2010/144554 A1 | 12/2010 |
| WO | WO 2013/071069 A2 | 5/2013 |
| WO | WO 2013/181712 A1 | 12/2013 |
| WO | WO 2014/026703 A1 | 2/2014 |

OTHER PUBLICATIONS

Foster Wheeler AG, "Circulating Fluidized-Bed (CFB) Steam Generators", http://www.fwc.com/GlobalPowerGroup/SteamGenerators/CirculatingFluidizedBed.cfm last accessed Apr. 1, 2013, p. 1.

Agrafiotis et al., "Evaluation of Porous Silicon Carbide Monolithic Honeycombs as Volumetric Receivers/Collectors of Concentrated Solar Radiation", Solar Energy Materials and Solar Cells, 2007, vol. 91, pp. 474-488.

Ávila-Marín , "Volumetric Receivers in Solar Thermal Power Plants with Central Receiver System Technology: A Review", Solar Energy, 2011, vol. 85, pp. 891-910.

Chacartegui et al., "Alternative Cycles Based on Carbon Dioxide for Central Receiver Solar Power Plants", Applied Thermal Engineering, 2011, vol. 31, pp. 872-879.

Chacartegui et al., "Analysis of Intermediate Temperature Combined Cycles with a Carbon Dioxide Topping Cycle", Proceedings of ASME Turbo Expo 2008: Power for Land, Sea and Air GT2008-51053, Jun. 2008, Berlin, Germany, pp. 673-680.

Chapman et al., "An Assessment of the Supercritical Carbon Dioxide Cycle for Use in a Solar Parabolic Trough Power Plant", Proceedings of SCCO2 Power Cycle Symposium 2009, Apr. 2009, Troy, NY, pp. 1-5.

Christian et al., "CFD Simulation and Heat Loss Analysis of the Solar Two Power Tower Receiver", Proceedings of the ASME 2012 6th International Conference on Energy Sustainability, ES2012-91030, Jul. 2012, San Diego, CA, pp. 1-9.

Dostal et al., "High-Performance Supercritical Carbon Dioxide Cycle for Next-Generation Nuclear Reactors", Nuclear Technology, Jun. 2006, vol. 154, pp. 265-282.

Dostal et al., "The Supercritical Carbon Dioxide Power Cycle: Comparison to Other Advanced Power Cycles", Nuclear Technology, Jun. 2006, vol. 154, pp. 283-301.

Falcone et al., "Assessment of a Solid Particle Receiver for a High Temperature Solar Central Receiver System", Sandia National Laboratories—Report, SAND85-8208, Feb. 1985, pp. 1-91.

(56) References Cited

OTHER PUBLICATIONS

Fuller et al., "Practical Considerations in Scaling Supercritical Carbon Dioxide Closed Brayton Cycle Power Systems", Proceedings of SCCO2 Power Cycle Symposium, Apr. 2009, Troy, NY, pp. 1-7.
Gil et al., "State of the Art on High Temperature Thermal Energy Storage for Power Generation Part 1—Concepts, Materials and Modellization", Renewable and Sustainable Energy Reviews, 2010, vol. 14, pp. 31-55.
Golob et al., "Heat Transfer Coefficient Between Flat Surface and Sand", Proceedings of the ASME 2011 5th International Conference on Energy Sustainability ES2011-54438, Aug. 2011. Washington D.C., pp. 1-10.
Hischier et al., "A Modular Ceramic Cavity-Receiver for High-Temperature High-Concentration Solar Applications", Journal of Solar Energy Engineering, Feb. 2012, vol. 134, pp. 011004-1-011004-6.
Ho et al., "Review of High-Temperature Central Receiver Designs for Concentrating Solar Power", Renewable and Sustainable Energy Reviews, 2014, vol. 29, pp. 835-846.
Kim et al., "A Study of Solid Particle Flow Characterization in Solar Particle Receiver", Solar Energy, 2009, vol. 83, pp. 1784-1793.
Kolb, "An Evaluation of Possible Next-Generation High Temperature Molten-Salt Power Towers", Sandia Report SAND2011-9320, Dec. 2011, pp. 1-121.
Kunii et al., "Heat Transfer Between Fluidized Beds and Surfaces", Fluidization Engineering—Second Edition, 1991, Butterworth-Heinemann, Chapter 13, pp. 313-323.
Ma et al., "Advanced Supercritical Carbon Dioxide Power Cycle Configurations for Use in Concentrating Solar Power Systems", Supercritical CO2 Power Cycle Symposium, Boulder, CO, May 2011, pp. 1-5.
Ma et al., "Thermal Energy Storage and Its Potential Applications in Solar Thermal Power Plants and Electricity Storage", Proceedings of the ASME 2011 5th International Conference on Energy Sustainability ES2011-54077, Washington D.C., Aug. 2011, pp. 1-10.
Martín et al., "ASCUAS: A Solar Central Receiver Utilizing a Solid Thermal Carrier", SAND82-8203, Jan. 1982, pp. 1-30.
Moisseytsev et al., "Performance Improvement Options for the Supercritical Carbon Dioxide Brayton Cycle", Jun. 6, 2007, Argonne National Laboratory, ANL-GenIV-103, pp. 1-52.
Neber et al., "Enhanced Solar Energy Harvest for Power Generation from Brayton Cycle", Proceedings of the ASME 2011 International Mechanical Engineering Congress & Exposition IMECE2011-62890, Nov. 2011, pp. 1-4.
Röger et al., "Face-Down Solid Particle Receiver Using Recirculation", Journal of Solar Energy Engineering, Aug. 2011, vol. 133, pp. 031009-1-031009-8.
Ruiz et al., "An Exergy-Based Metric for Evaluating Solar Thermal Absorber Technologies for Gas Heating", Proceedings of the ASME/JSME 2011 8th Thermal Engineering Joint Conference, Honolulu, Hawaii, Mar. 2011, pp. 1-9.
Siegel et al., "Design and On-Sun Testing of a Solid Particle Receiver Prototype", Proceedings of ES2008 (Energy Sustainability 2008) ES2008-54090, Aug. 2008, Jacksonville, FL, pp. 1-6.
Siegel et al., "Development and Evaluation of a Prototype Solid Particle Receiver: On-Sun Testing and Model Validation", Journal of Solar Energy Engineering, May 2010, vol. 132, pp. 021008-1-021008-8.
Siegel et al., Thermal Radiation Heat Transfer, Third Edition, Hemisphere Publishing Corporation, 1992, pp. 292-297.
Teichel et al., "General Calculation of Semi-Gray Radiation Heat Transfer in Solar Central Cavity Receivers", Proceedings of SOLARPACES 2011, Granada, Spain, Sep. 2011, pp. 1-8.
Turchi, "Supercritical CO2 for Application in Concentrating Solar Power Systems", Proceedings of SCCO2 Power Cycle Symposium 2009, Troy, NY, Apr. 2009, pp. 1-5.
Wagner, Research Performance Progress Report (RPPR), Direct s-CO2 Receiver Development, Quarterly Report to DOE Q113, Submitted Jan. 15, 2013, pp. 1-21.
Wagner, Research Performance Progress Report (RPPR), Direct s-CO2 Receiver Development, Quarterly Report to DOE Q213, Submitted Apr. 15, 2013, pp. 1-21.
Wagner, "Simulation and Predictive Performance Modeling of Utility-Scale Central Receiver System Power Plants", Master of Science—Mechanical Engineering Thesis, University of Wisconsin—Madison, 2008, pp. 1-45.
Wright et al., "Operation and Analysis of a Supercritical CO2 Brayton Cycle", Sandia National Laboratories, Sandia Report SAND2010-0171, Sep. 2010, pp. 1-101.
Wu et al., "Direct Absorption Receivers for High Temperatures", SolarPaces 2011, http://elib.dlr.de/73113/1/SolarPACES2011_WU_DLR.pdf, Sep. 2011, last accessed on Feb. 2, 2017, pp. 1-8.

* cited by examiner

SYSTEMS AND METHODS FOR DIRECT THERMAL RECEIVERS USING NEAR BLACKBODY CONFIGURATIONS

CROSS-REFERENCE TO RELATED APPLICATIONS

This application claims priority to, and the benefit of, U.S. Provisional Patent Application No. 61/993,671, entitled "DIRECT THERMAL RECEIVER DESIGNS USING NEAR BLACKBODY CONFIGURATIONS" which was filed on May 15, 2014, and is a continuation of US. patent application Ser. No. 14/714,030, which was filed on May 15, 2015, and which are herein incorporated by reference in their entirety.

CONTRACTUAL ORIGIN

The United States Government has rights in this invention under Contract No. DE-AC36-08GO28308 between the United States Department of Energy and the Alliance for Sustainable Energy, LLC, the manager and operator of the National Renewable Energy Laboratory.

BACKGROUND

A typical concentrating solar energy conversion system includes a field of sun-tracking mirrors (heliostats) that focus a solar flux onto a tower mounted thermal receiver. The receiver is heated by the solar flux and transfers that heat as thermal energy to a heat transfer fluid such as water, oil, or molten salts. In other cases, solar energy is transferred to solid particles, or a gas such as carbon dioxide, which then serve the role of a heat transfer media. Some solar energy conversion plants also utilize a steam-Rankine system, which creates steam by transferring energy from a hot heat transfer fluid or media to a working fluid (e.g. water) by use of a heat exchanger. The steam is then used to drive one or more steam turbines to produce electricity. Alternatively, some solar energy conversion plants directly use a heat transfer fluid also as the working fluid to drive a turbine to produce electricity, thus eliminating the need for a heat exchanger.

Some thermal receivers are able to operate at high temperatures (e.g. 650° C. or above). However, such high temperature systems typically utilize air or solid particles as the heat transfer medium, and may suffer from low thermal efficiencies when compared to lower-temperature thermal receivers. Other receivers, such as those utilizing molten salts or steam as the heat transfer medium can achieve higher thermal efficiencies, but are unable to operate at the high temperatures found in the typical air or solid particles systems.

Of considerable interest, is supercritical carbon dioxide (s-$OO_2$) as the working fluid in concentrating solar power systems. S—$CO_2$ concentrating solar power systems are projected to operate with working fluid temperatures that exceed 650° C. are capable of operating as both a heat transfer fluid and a working fluid, and $CO_2$ is a readily available, low toxicity compound. However, most concentrating solar power receivers currently available suffer from low thermal efficiencies, largely due to radiant and convective heat losses from the receivers' various hot surfaces to the environment. Thus, there remains a need in the art for higher efficiency, higher temperature thermal receivers for next-generation concentrating solar power plants.

SUMMARY

An aspect of the present invention is a receiver that includes at least one external panel configured to form an internal cavity and an open face. The open face is positioned substantially perpendicular to a longitudinal axis and forms an entrance to the internal cavity. The receiver also includes at least one internal panel positioned within the cavity and aligned substantially parallel to the longitudinal axis, and the at least one internal panel includes at least one channel configured to distribute a heat transfer medium.

In some embodiments of the present invention, the at least one external panel may be a panel configured as a cylinder. In some embodiments of the present invention, the at least one external panel may include a back panel positioned substantially parallel to the open face, and a side panel positioned substantially parallel to the longitudinal axis. The side panel may have an edge that forms an outer boundary with the entrance.

In some embodiments of the present invention, the at least one external panel may include a back panel positioned substantially parallel to the open face, and four side panels positioned substantially parallel to the longitudinal axis. Each side panel may have an edge that forms at least a portion of an outer boundary with the entrance. In some further embodiments of the present invention, the at least one external panel may include at least one channel configured to receive the heat transfer medium. In still further embodiments, the at least one internal panel of a receiver may include a first surface positioned substantially parallel to the longitudinal axis, and a second surface positioned substantially parallel to the first surface, with the at least one channel positioned between the first surface and the second surface.

In some embodiments of the present invention, the at least one channel may include a plurality of channels, where each channel may include a tube positioned substantially parallel to the longitudinal axis, each tube is configured with an inlet to receive the heat transfer medium at a first temperature, and each inlet is positioned closer to the entrance of the cavity than to the back panel. In further embodiments, each tube may include an outlet to return the heat transfer medium at a second temperature higher than the first temperature, where each outlet may be positioned closer to the back panel than to the open face of the receiver.

In further embodiments of the present invention, the at least one internal panel may include at least two internal panels. The receiver may also include at least one heat transfer medium supply header for supplying the heat transfer medium at the first temperature to the at least two internal panels, and at least one heat transfer medium return header for returning the heat transfer medium from the at least two internal panels at the second temperature. The at least two internal panels may be joined to form at least one panel module. The inlet of each tube may be connected to the at least one supply header, the outlet of each tube may be connected to the at least one return header, the supply header may be positioned closer to the entrance of the receiver than to the back panel, and the return header may be positioned closer to the back wall of the receiver than to the entrance.

In some embodiments of the present invention, each tube may include an angled portion that is not parallel with the longitudinal axis. The angled portion may be positioned closer to the back panel of the receiver than the entrance, and the angled portion may be configured to intercept radiation that enters the entrance at a trajectory that is substantially parallel to the longitudinal axis, such that the radiation entering substantially parallel to the longitudinal axis does not directly impinge upon the back panel of the receiver.

In some embodiments of the present invention, the receiver may be constructed using at least three internal panels, where each internal panel may include at least two edges where each edge may be aligned substantially parallel to the longitudinal axis. Each edge may be in direct contact with at least one edge of at least one of the other panels, such that the at least three internal panels create at least one passage having a triangular-shaped entrance that may be substantially positioned within the open face of the receiver.

In still further embodiments of the present invention, the receiver may be constructed using at least at least four internal panels, where each internal panel may include at least two edges, and each edge may be aligned substantially parallel to the longitudinal axis. Each edge may be in direct contact with at least one edge of at least one of the other panels, such that the at least four internal panels create at least one passage having either a square-shaped entrance or a rectangular-shaped entrance that may be substantially positioned within the open face of the receiver.

Other objects, advantages, and novel features of the present invention will become apparent from the following detailed description of the invention when considered in conjunction with the accompanying drawings.

DRAWINGS

Exemplary embodiments are illustrated in referenced figures of the drawings. It is intended that the embodiments and figures disclosed herein are to be considered illustrative rather than limiting.

FIGS. 15A-D illustrate various designs for panels and designs for supplying low temperature heat transfer fluid to the panels and returning high temperature heat transfer fluid from the panels.

Figure 16A:
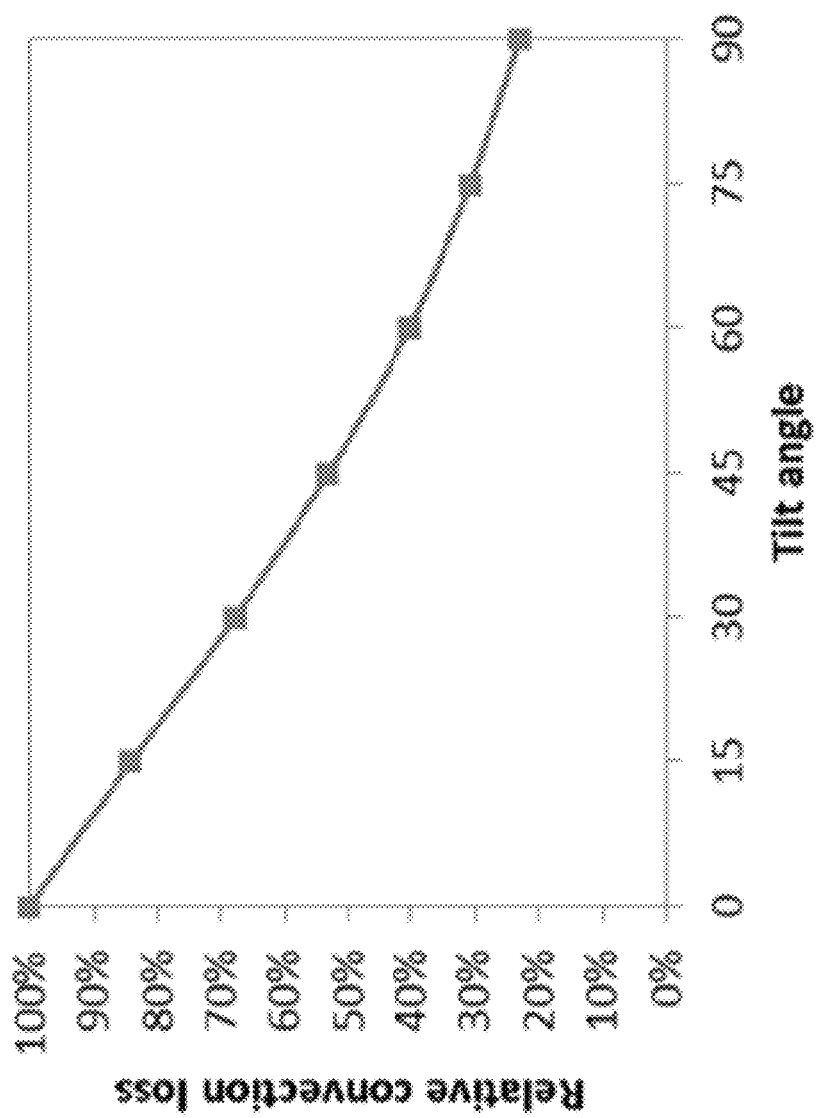
Figures 16B, 16C:
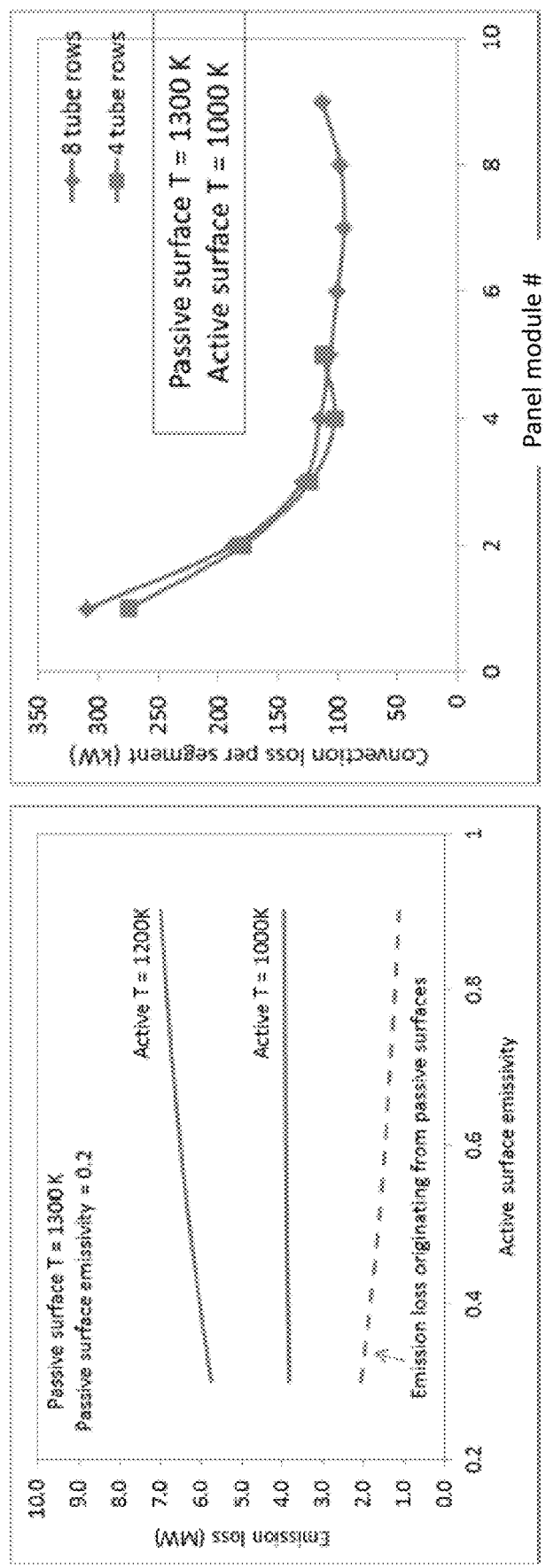

FIGS. 16A-C illustrate modeling results including estimates of convection and radiation losses from a receiver based on various design metrics.

Figure 17:
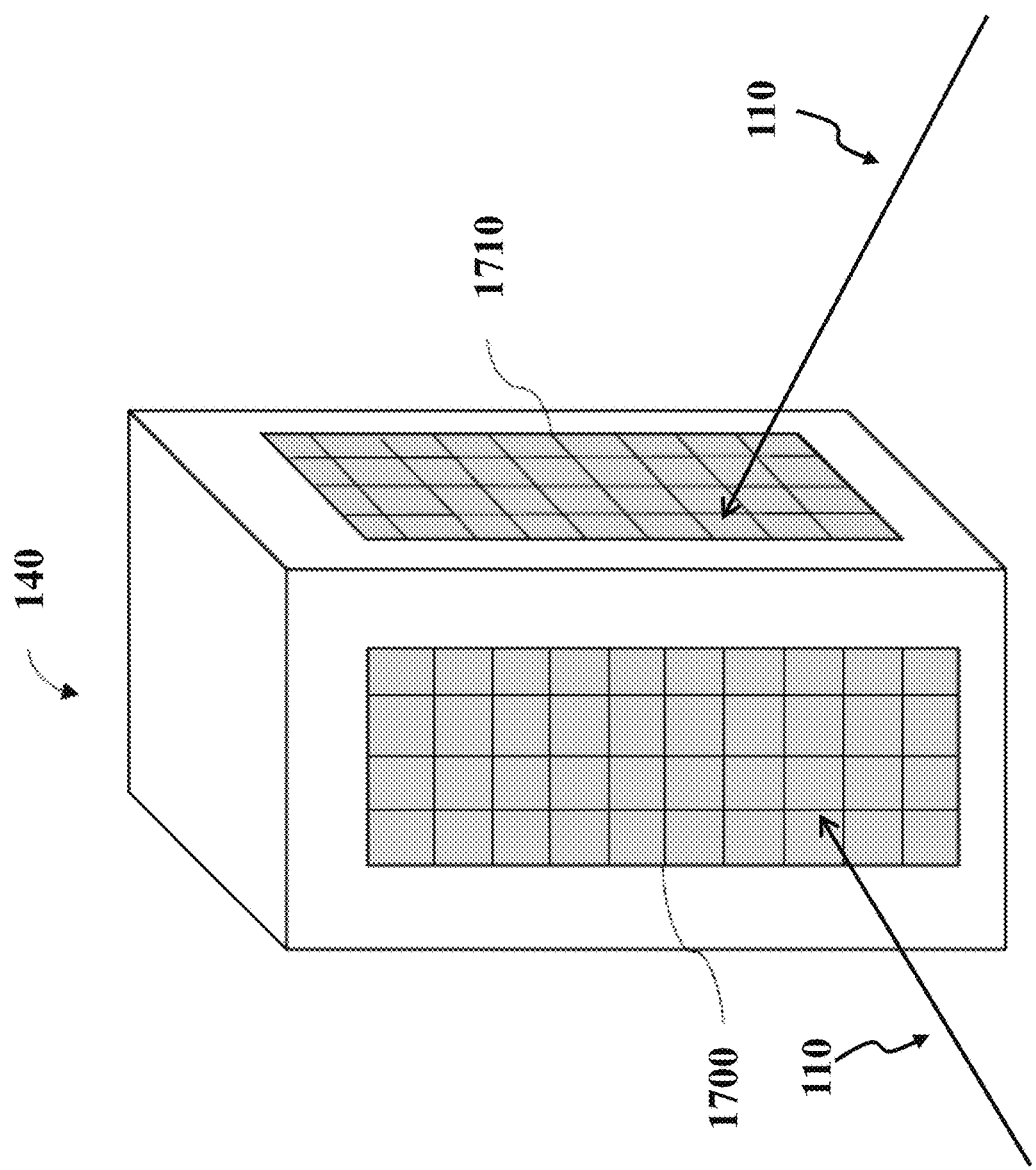

FIG. 17 illustrates a receiver with more than one open faces for receiving radiation from a heliostat array, according to exemplary embodiments of the present invention.

Figure 18:
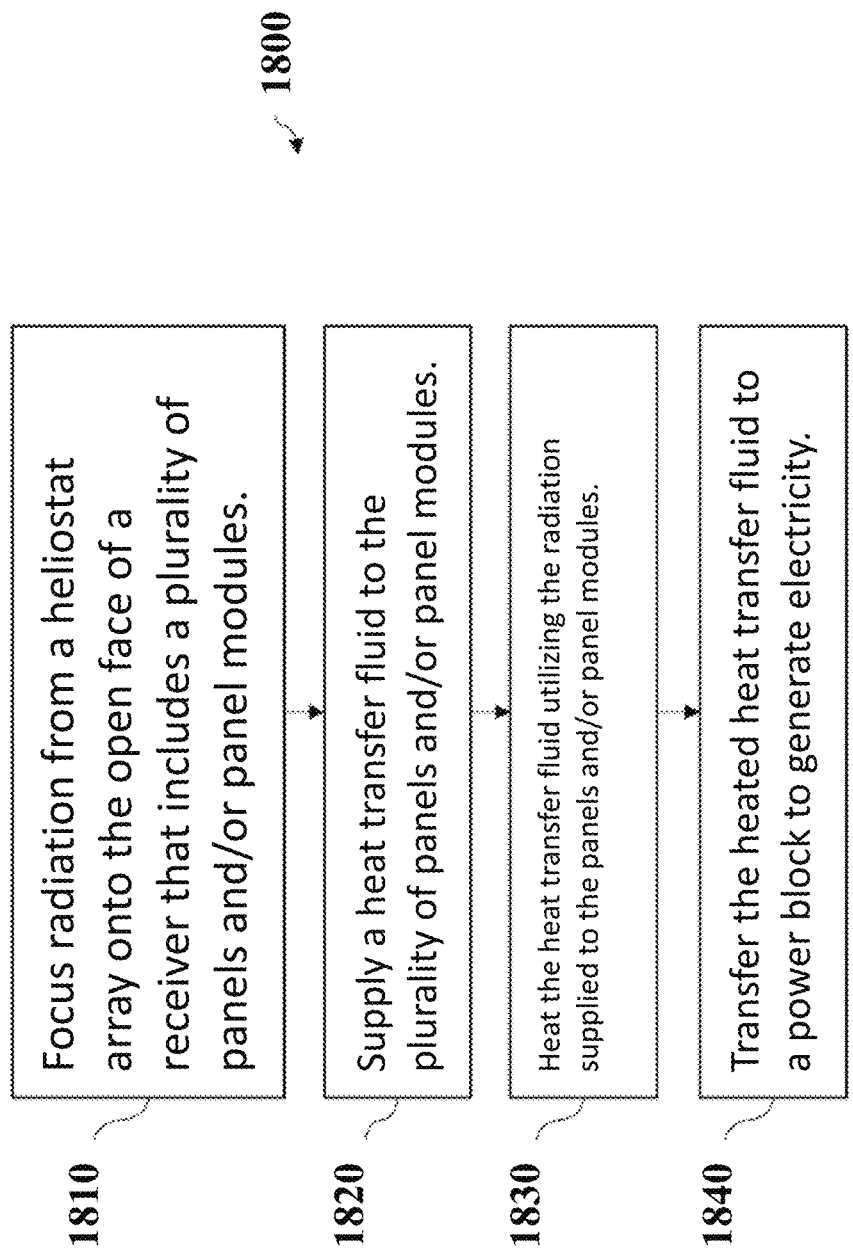

FIG. 18 summarizes a method for providing radiation from a heliostat field to a receiver for heating a heat transfer fluid for the production of electricity, according to exemplary embodiments of the present invention.

Figure 19:
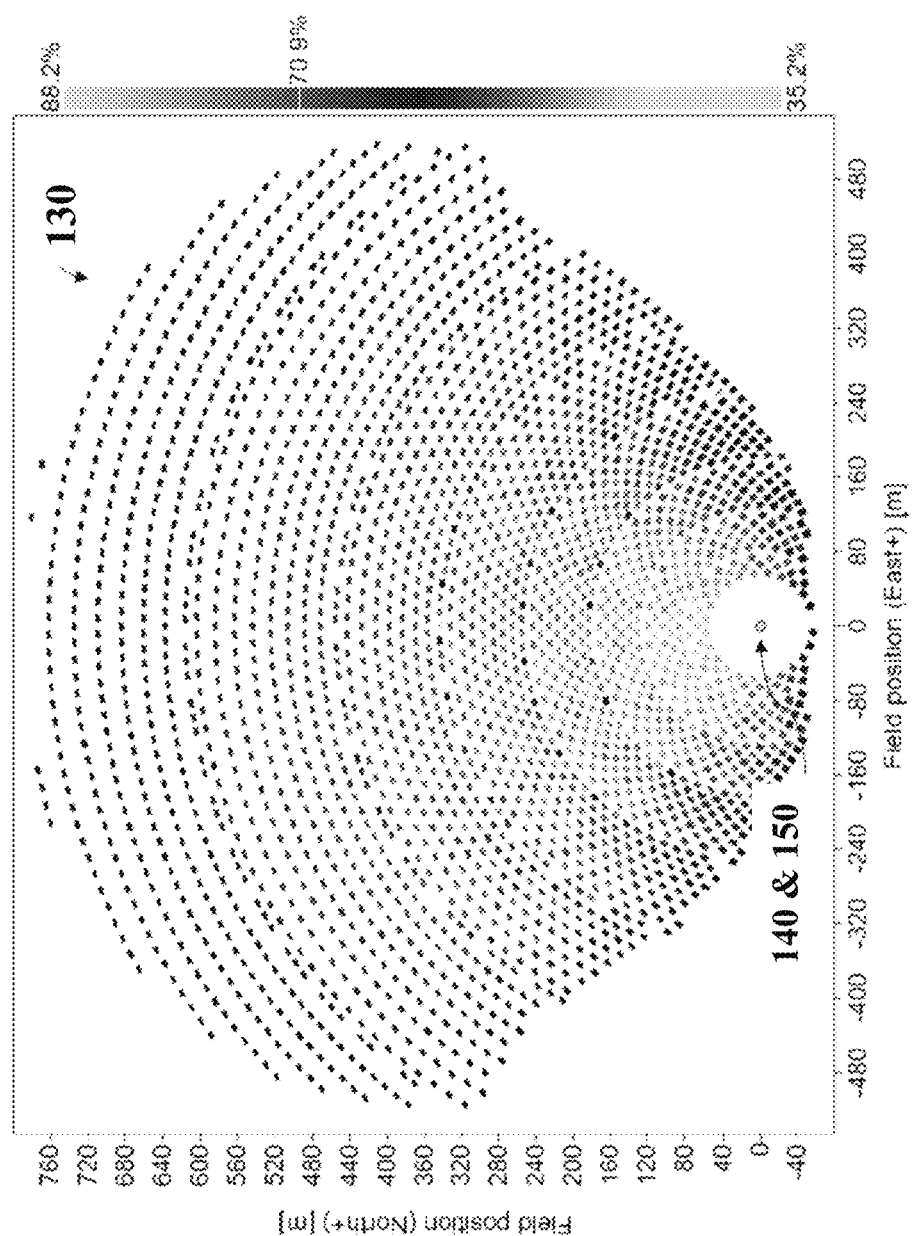

FIG. 19 illustrates a hypothetical heliostat array for a concentrating solar power plant, which was utilized to model the radiation (flux) received at the face of a receiver, according to exemplary embodiments of the present invention.

Figure 20:
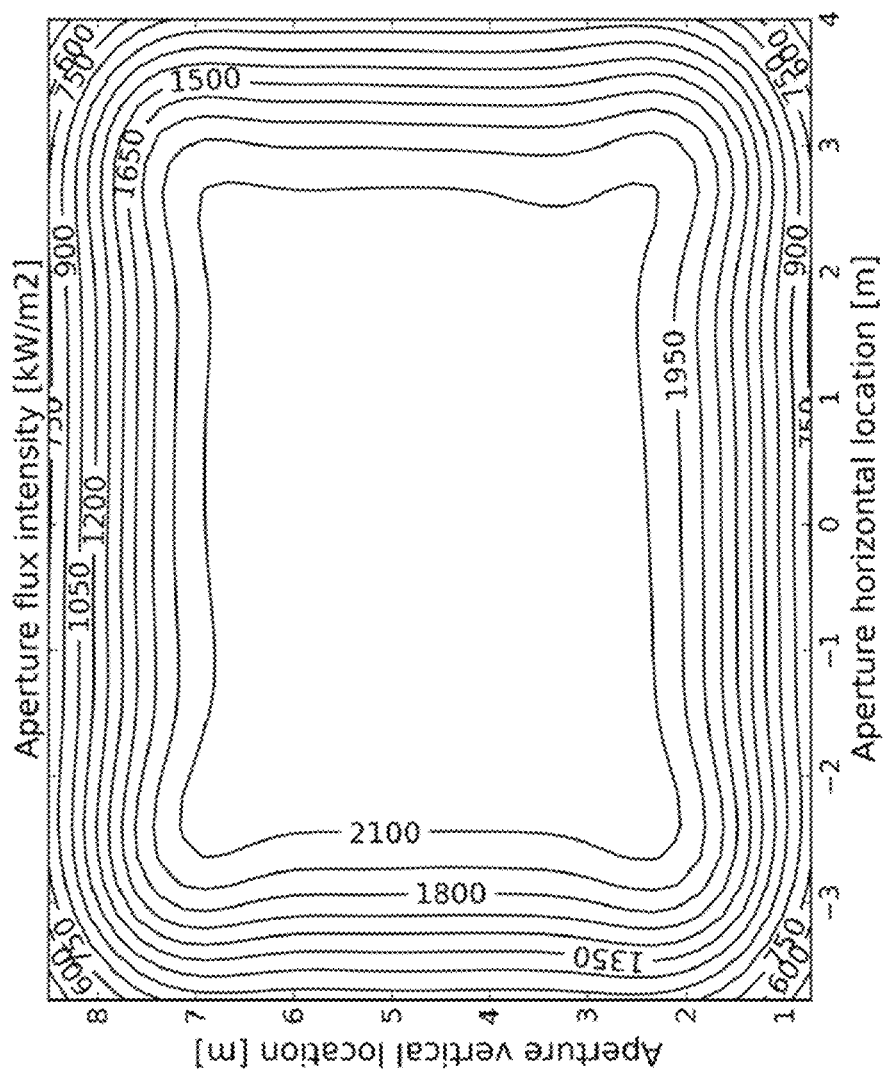

FIG. 20 illustrates the modeling results for the radiation received at the face of the receiver, using the heliostat array illustrated in FIG. 19, according to exemplary embodiments of the present invention.

Figure 21:
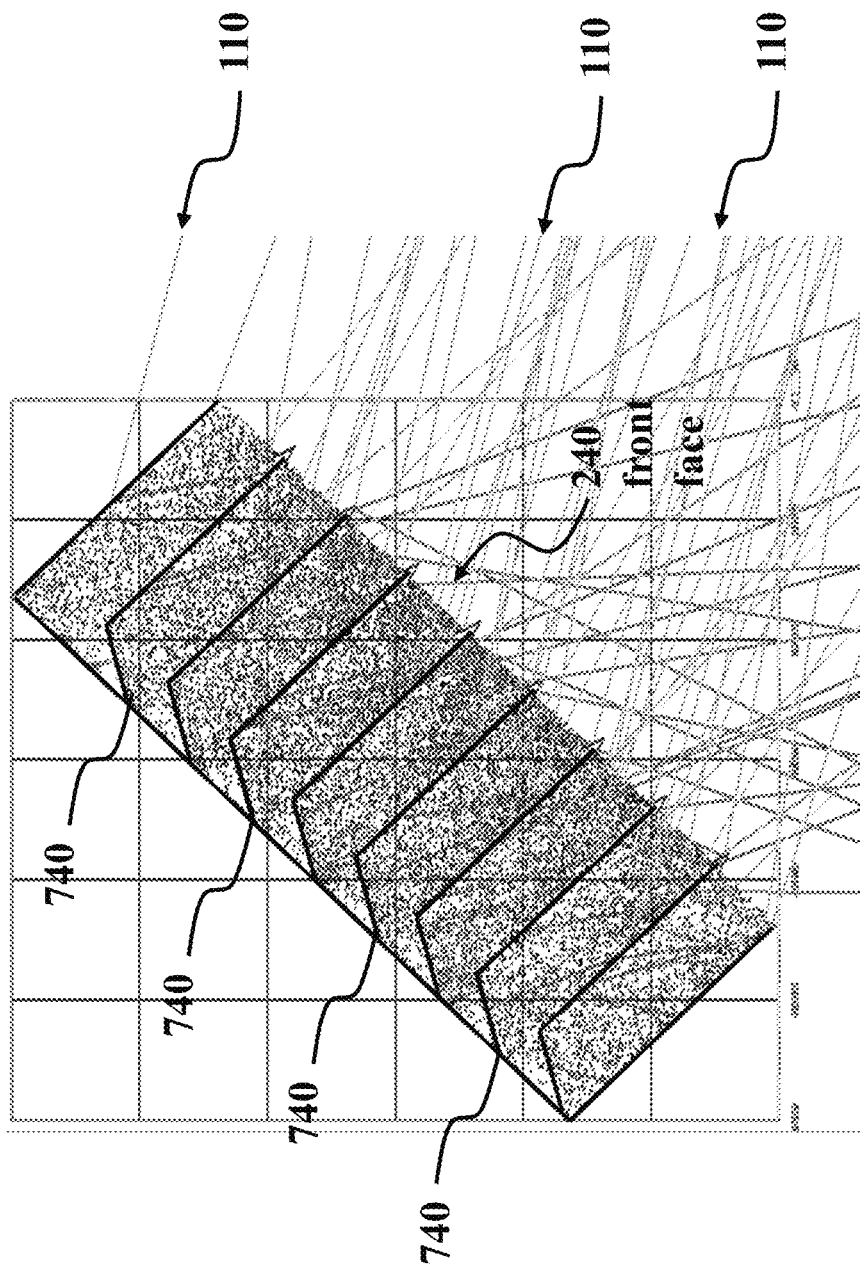

FIG. 21 illustrates modeling results for a collection of individual rays of radiation received by a receiver, utilizing the heliostat array shown in FIG. 19, according to exemplary embodiments of the present invention.

Figures 22A, 22B:
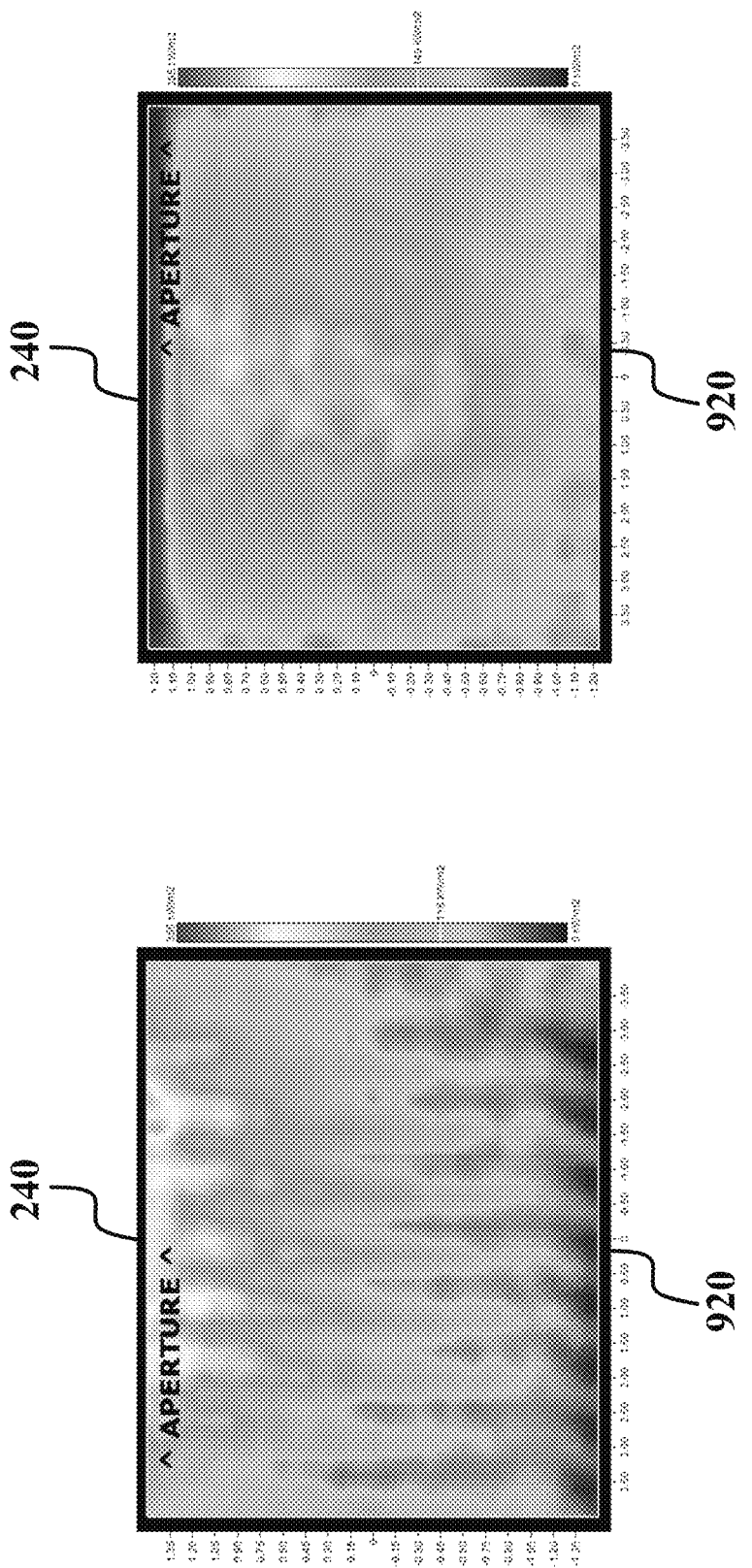

FIGS. 22A and 22B illustrate modeling results for the radiant fluxes impinging upon two panels, a vertical bisecting active panel, and a horizontal active panel, according to exemplary embodiments of the present invention.

Figures 23A, 23B:
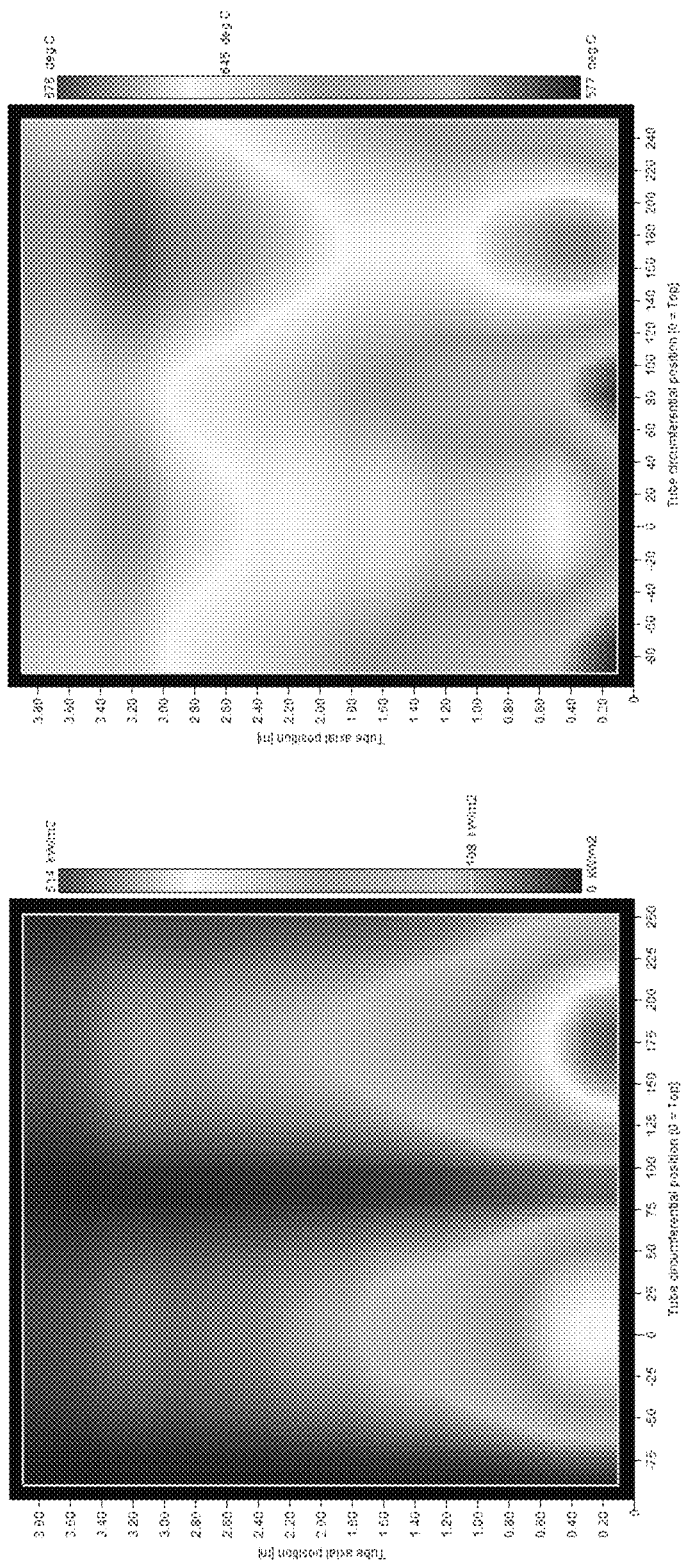

FIGS. 23A and 23B illustrate modeling results for flux intensities and heat transfer fluid channel (e.g. tubes) skin temperatures for an exemplary design basis, according to exemplary embodiments of the present invention. The profiles show circumferential position on the horizontal axis and axial position on the vertical axis, with the top of the plot near the back of the cavity.

Figure 24B:
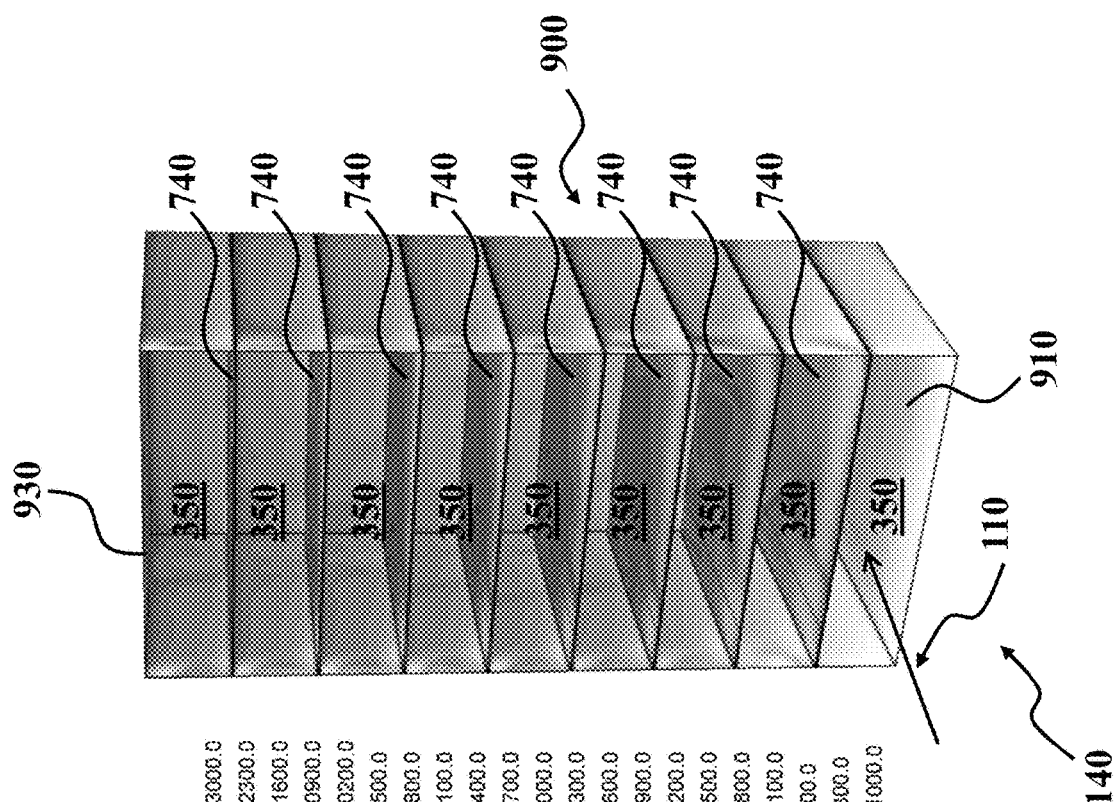
Figure 24A:
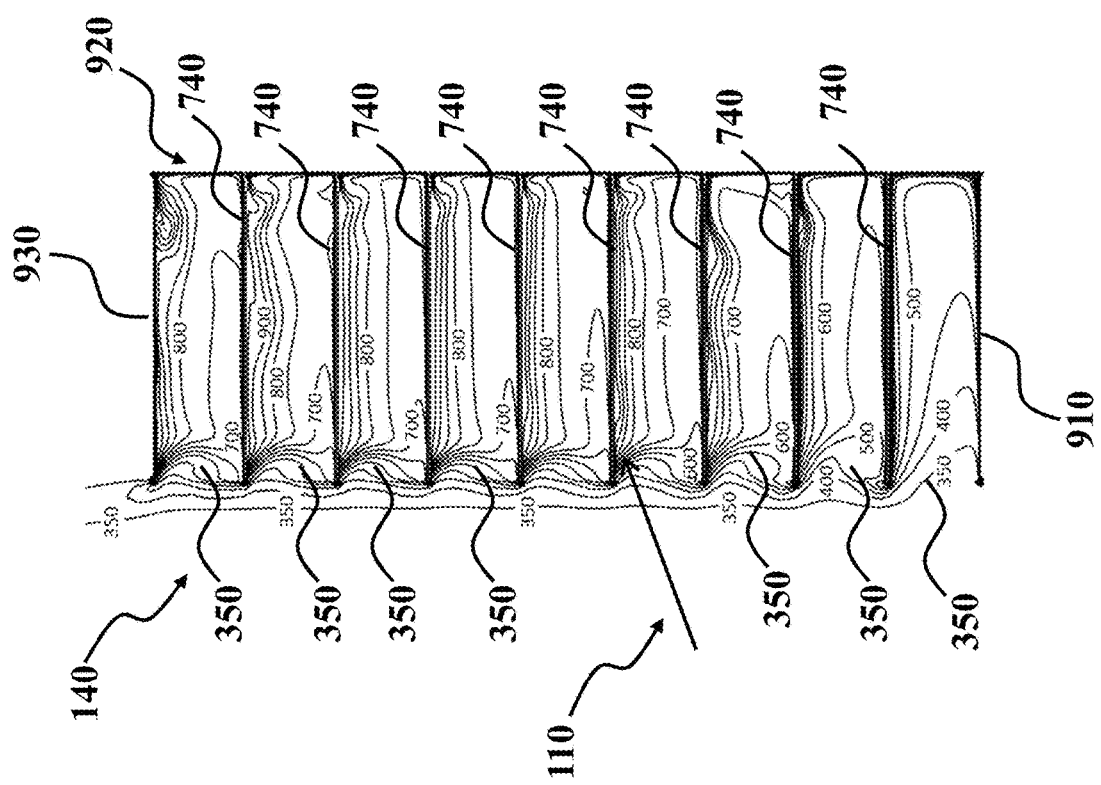

FIGS. 24A and 24B illustrate modeling results for air temperatures in Kelvin and wall thermal loss fluxes [$W/m^2$] for a receiver constructed in a stacked passage and/or panel module configuration, according to exemplary embodiments of the present invention.

Figures 25A, 25B:
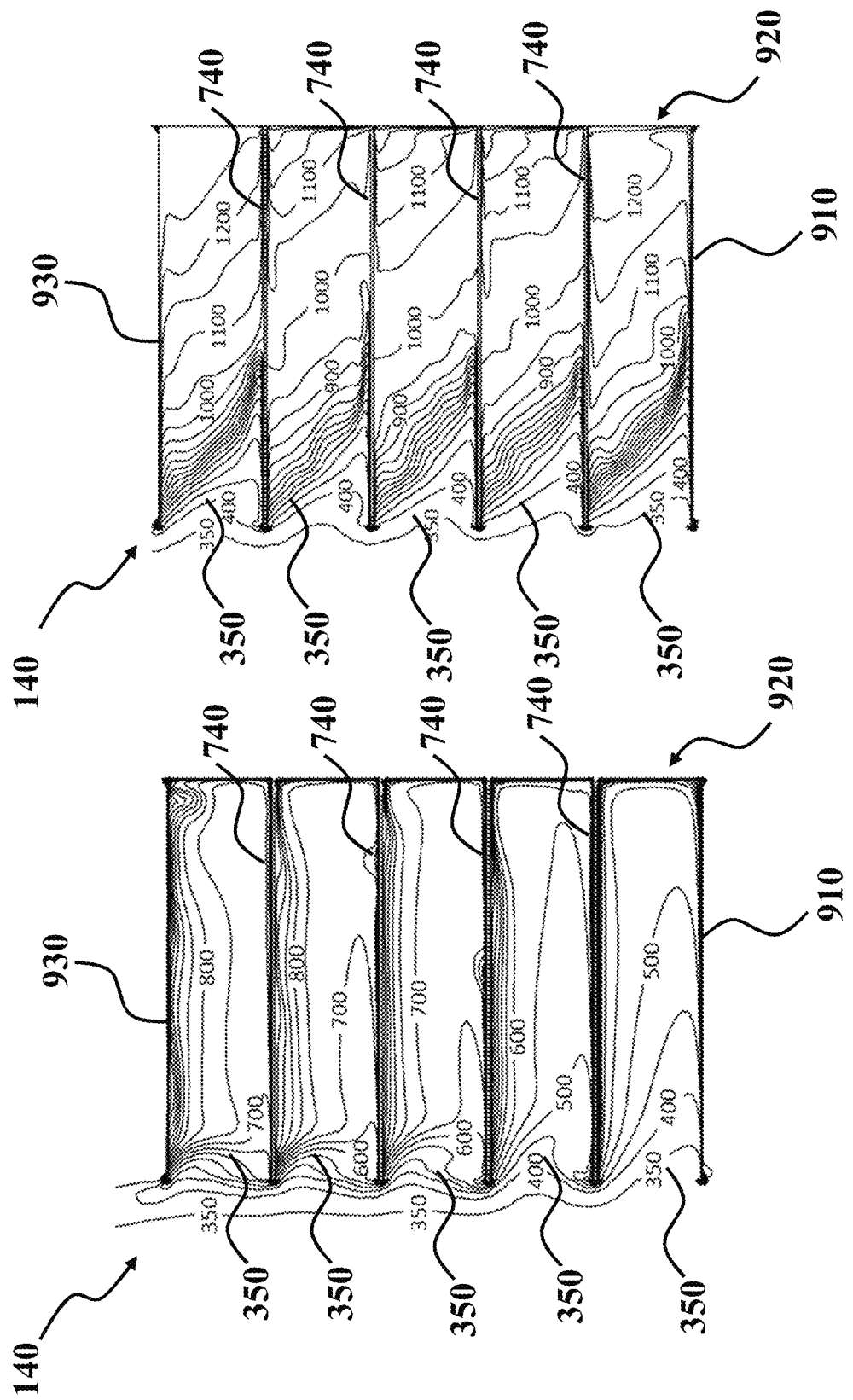

FIGS. 25A and 25B illustrated modeling results that show the relationship of convection losses from a receiver to the surrounding environment due to the receiver's longitudinal axis relative to the ground, according to exemplary embodiments of the present invention.

Figure 26:
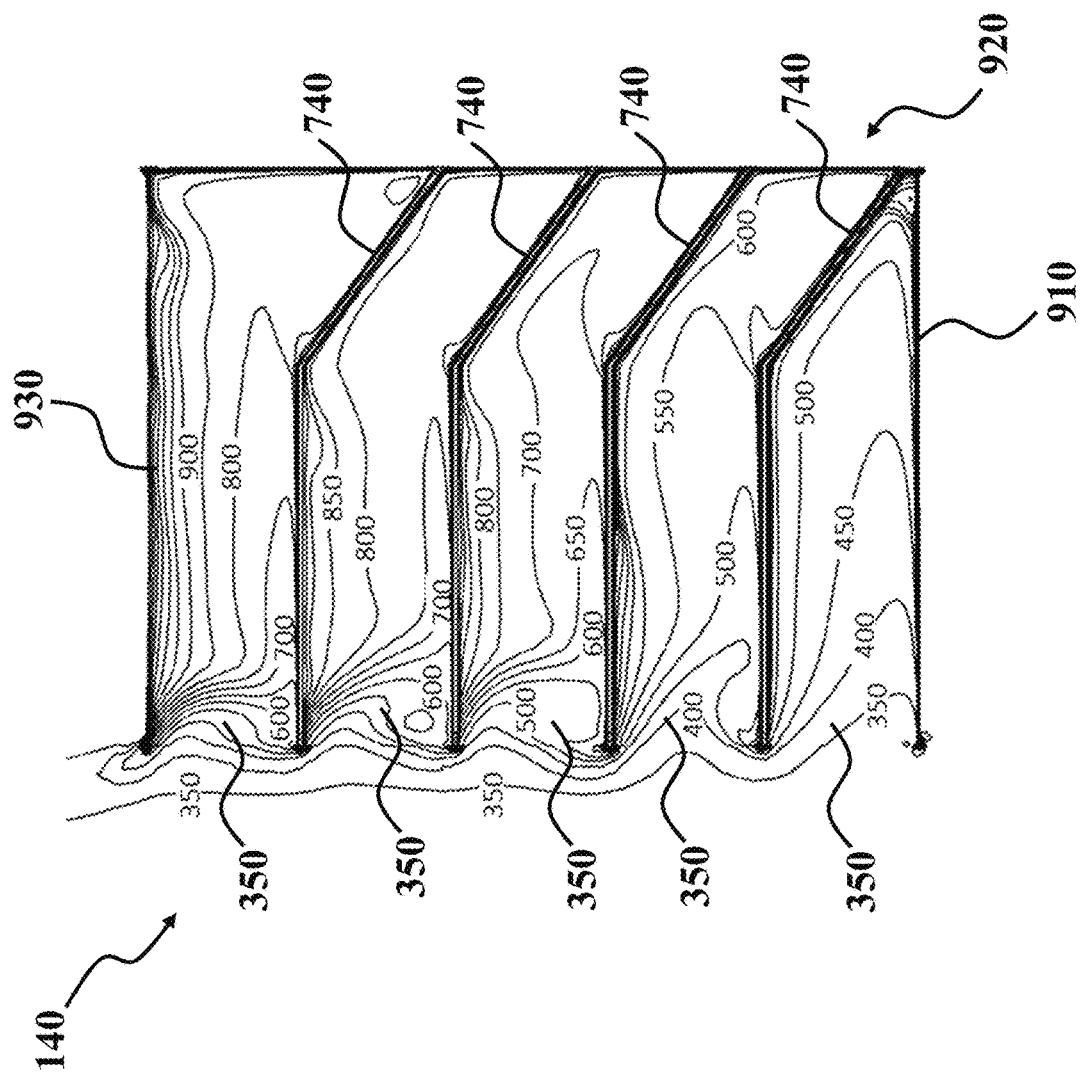

FIG. 26 illustrates temperature profiles predicted by modeling of a receiver system constructed from panel modules that included angled sections positioned towards the interior of the receiver cavity, according to exemplary embodiments of the present invention.

Figure 27:
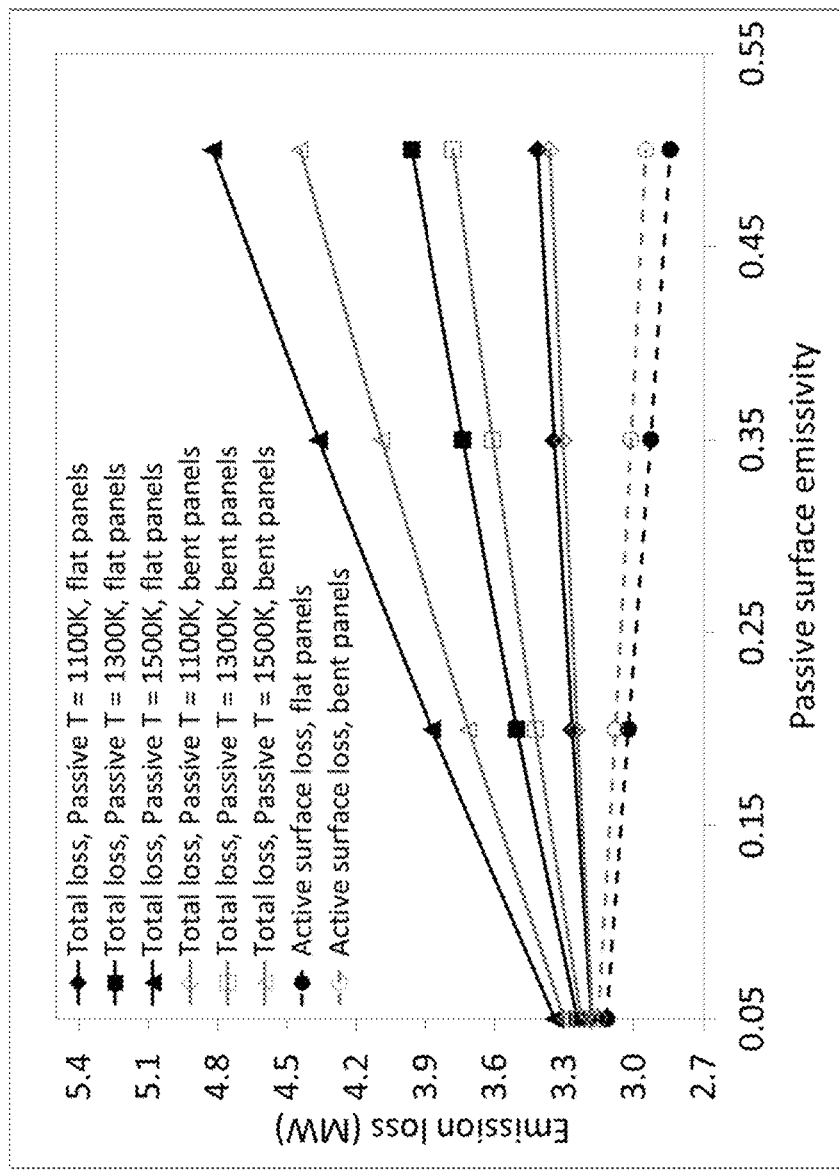

FIG. 27 summarizes modeling results for radiant energy losses from a receiver as a function of surface temperatures and surface emissivity for receiver configurations with angled portion of the panel modules, and without, according to exemplary embodiments of the present invention.

Figures 28A, 28B:
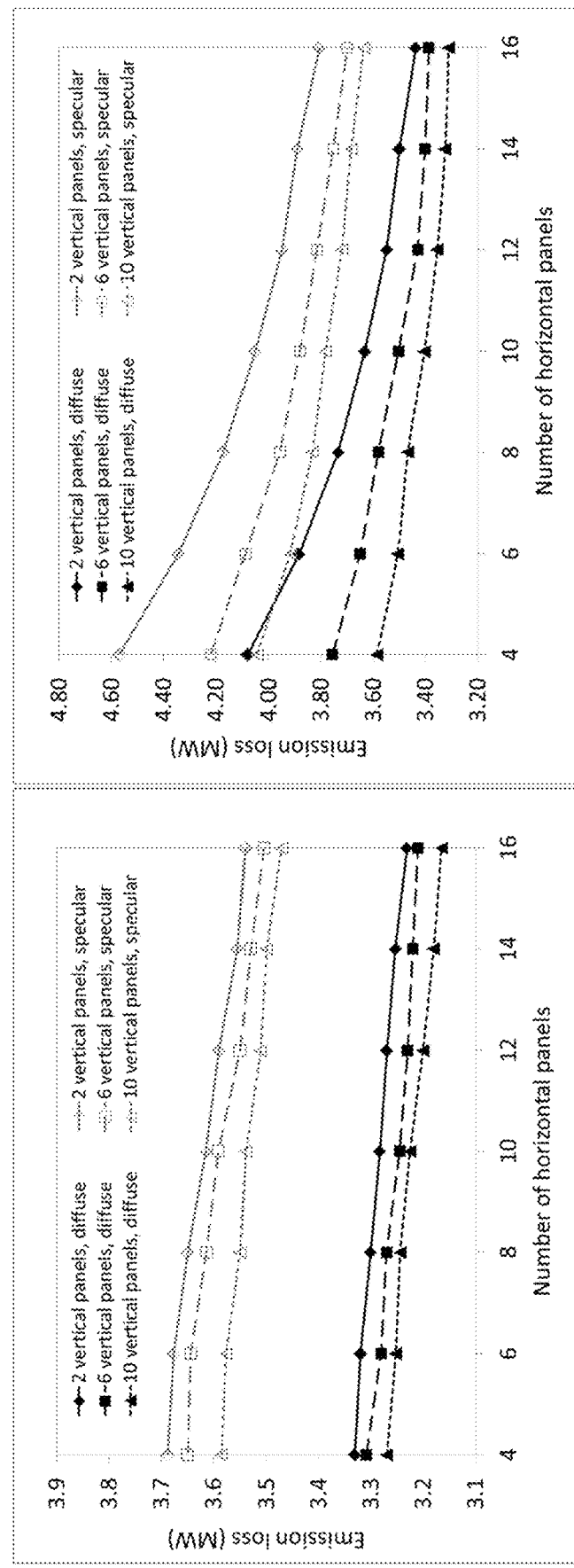

FIGS. 28A and 28B summarize modeling results, showing the relationship of reflection characteristics, number of panel modules (referred to here as "absorber panels"), and number of vertical bisecting panels (referred to here as "separator panels"), for two different surface emissivities, 0.1 and 0.5 respectively.

Figure 29:
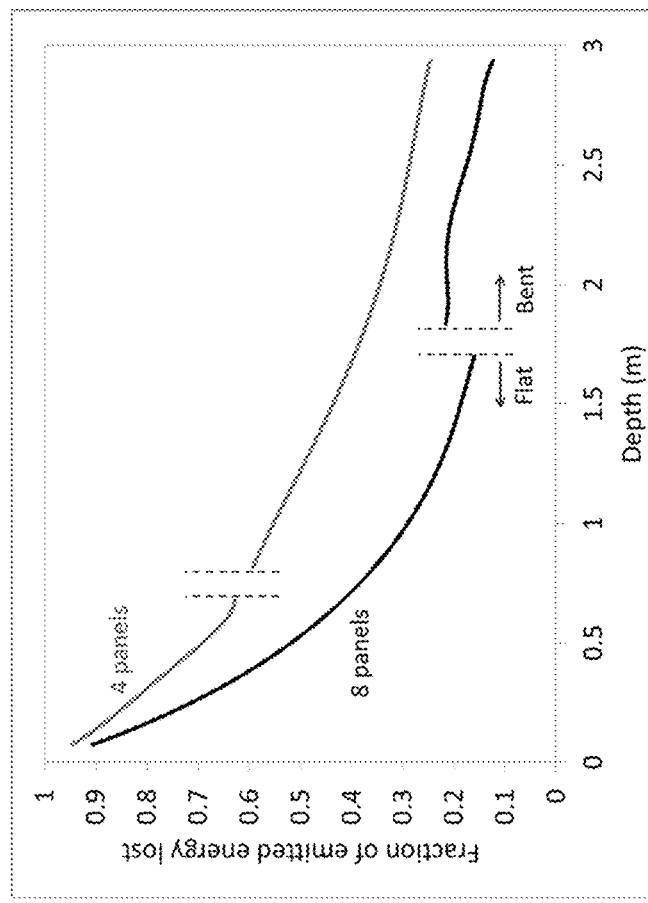
Figure 30:
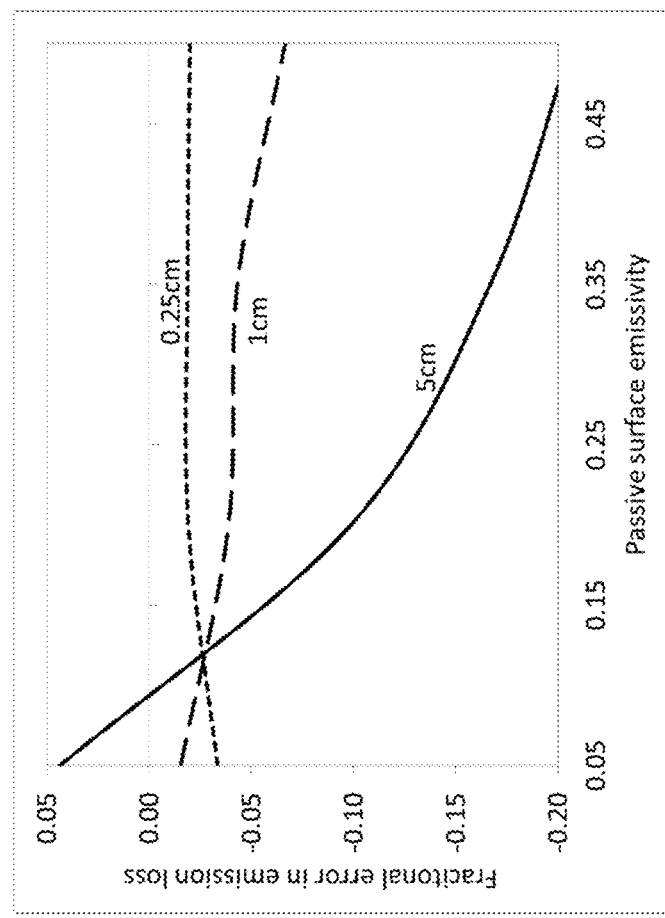

FIGS. 29 and 30 summarizing modeling results of radiant heat losses from the internal surfaces of a receiver, according to exemplary embodiments of the present invention.

| REFERENCE NUMBERS | |
|---|---|
| 100 | concentrating solar power system |
| 110, 420 | radiation |
| 111, 112, 430 | reflected radiation |
| 120 | heliostat |
| 130 | heliostat array |
| 140 | receiver |
| 150 | tower |
| 160 | low temperature heat transfer fluid |
| 170 | high temperature heat transfer fluid |
| 200 | panel |
| 210 | heat transfer fluid channel |
| 220 | surface |
| 230 | receiver cavity |
| 240 | receiver face |
| 300 | first panel |
| 310 | second panel |
| 320, 400 | first surface |
| 330, 410 | second surface |
| 340 | third surface |
| 350 | passage |
| 500 | heat transfer fluid supply aperture |
| 510 | heat transfer fluid supply channel |
| 520 | heat transfer fluid return channel |
| 530 | heat transfer fluid return aperture |
| 540 | wall |
| 700 | heat transfer fluid supply header |
| 710, 720, 730 | heat transfer fluid return header |
| 740 | panel module |
| 900 | side panel |
| 910 | base panel |
| 920 | back panel |
| 930 | top panel |
| 940 | bisecting panel |
| 1000 | radiation shield |
| 1010 | fastener |
| 1020 | cooling channels |
| 1500 | 180 degree piping bends |
| 1510 | baffle |
| 1520 | collection channel |
| 1700 | first open receiver face |
| 1710 | second open receiver face |
| 1800 | method of producing electricity |
| 1810 | focusing |
| 1820 | supplying |
| 1830 | heating |
| 1840 | transferring |

DETAILED DESCRIPTION

Figure 1:
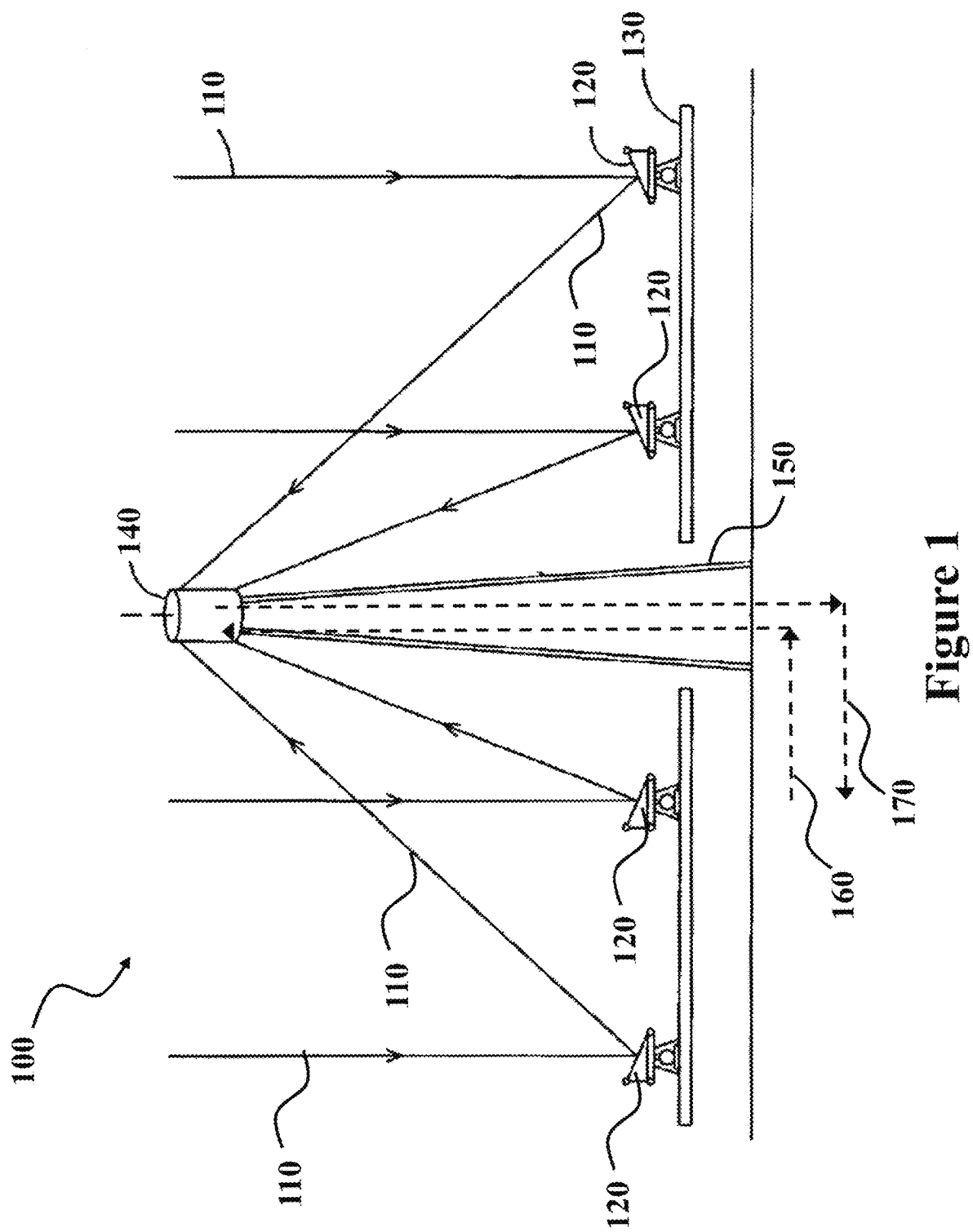
FIG. 1 illustrates a concentrating solar power system for capturing solar radiation and transferring the energy from the radiation to a heat transfer fluid, according to exemplary embodiments of the present invention.

FIG. 1 illustrates a concentrating solar power system 100, including a plurality of heliostats 120 configured to capture radiation 110 (e.g. solar radiation). The plurality of heliostats 120 may be oriented in an array 130 around a centrally located tower 150 with a receiver 140 positioned atop the tower 150. In some examples, the plurality of heliostats 120 may be positioned a full 360 degrees around the tower 150, or less than 360 degrees (e.g. in a semicircle). Each heliostat 120 may include one or more mirrors positioned to reflect the radiation 110 (or solar flux where flux is defined as a unit of radiation and/or power per unit surface area) and to direct the radiation 110 to the receiver 140 positioned on the tower 150. Some of the energy in the radiation 110 directed to the receiver 140 may be captured and transferred to a relatively low temperature heat transfer fluid 160, resulting in a relatively high temperature heat transfer fluid 170, which is then transported to a power block to produce electricity (not shown). The high temperature heat transfer fluid 170 may then act either as a working fluid by performing work, for example, by driving a turbine (not shown) to produce electricity or, alternatively, the heat transfer fluid may transfer energy to a separate working fluid (not shown) by a heat exchanger (not shown) and the working fluid may then separately perform work to produce electricity.

Supercritical $CO_2$ is one example of a fluid that may act as both a heat transfer fluid and a working fluid, thus eliminating at least one heat exchanger from the power block design. Some embodiments described herein may enable the use of a high-temperature direct supercritical $CO_2$ (s-$CO_2$) receiver for concentrating solar power (CSP) applications in conjunction with a s-$CO_2$-Brayton power cycle to produce electricity. Other examples of heat transfer fluids that may be utilized in some embodiments of the present invention include sodium metal, molten salt, a molten metal, fluidized gas, or any other suitable fluid. In other embodiments of the present invention, a solid such as solid particles or solid powders may be used in place of a fluid or in addition to a fluid, as a heat transfer medium. In some embodiments of the present invention, the receiver 140 may be capable of operating at temperatures in excess of 650° C. while achieving thermal efficiencies in excess of n 90%.

In some embodiments of the present invention, a receiver may be incorporated into a power generation system to transfer solar energy to the working fluid of a power cycle, such as the power generation systems described in U.S. patent application Ser. No. 13/855,088, entitled "METHODS AND SYSTEMS FOR CONCENTRATED SOLAR POWER", now published as U.S. Patent Application Publication 2013/0257056, and which is incorporated herein by reference in its entirety.

Figure 2:
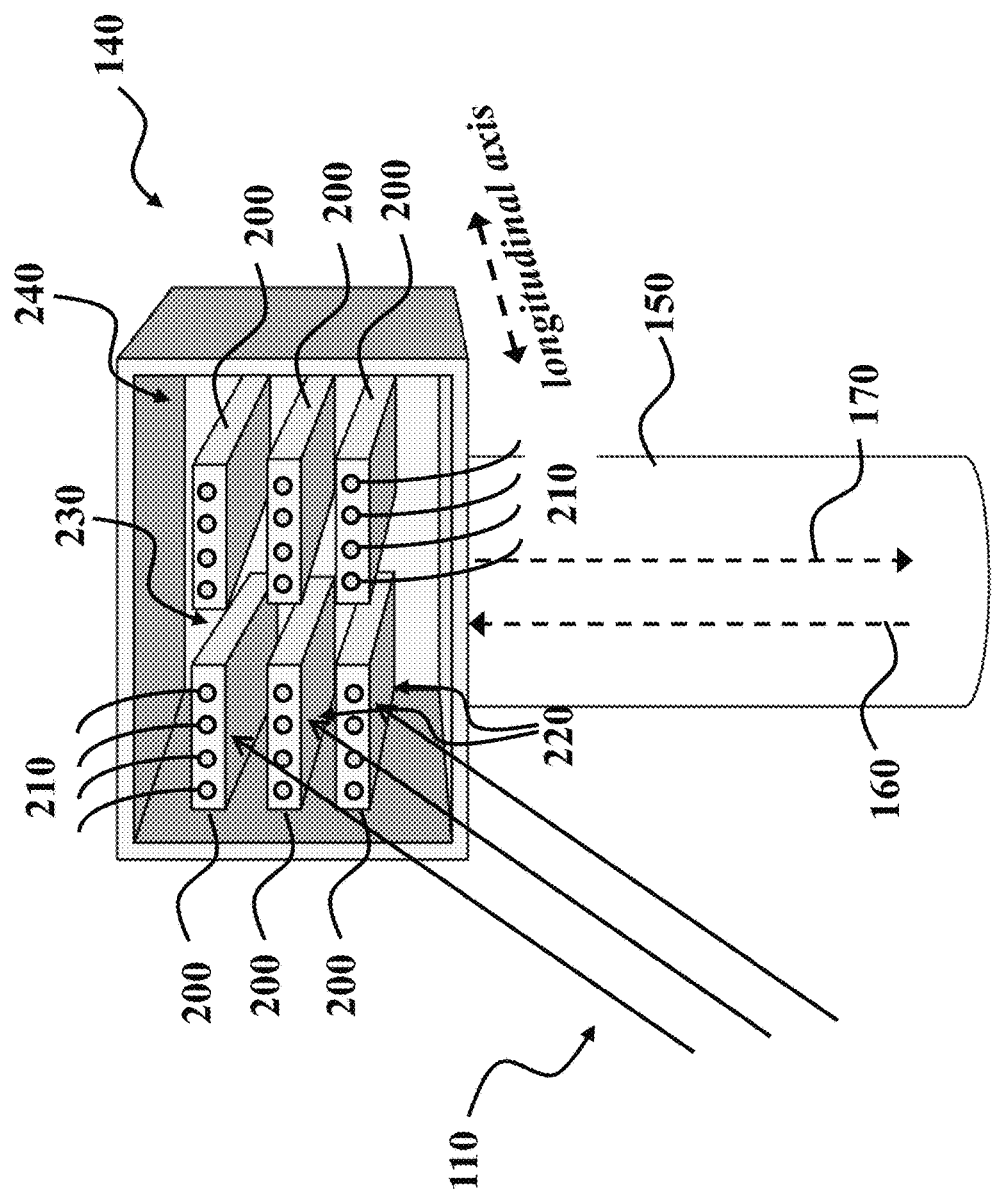
FIG. 2 illustrates a receiver for capturing radiation and transferring the energy from the radiation to a heat transfer fluid, according to exemplary embodiments of the present invention.

FIG. 2 illustrates a receiver 140 positioned atop a tower 150, where the tower supplies a low temperature heat transfer fluid 160 to the receiver 140 and returns the resulting high temperature heat transfer fluid 170 to the power block (not shown). In some embodiments, a plurality of panels 200 may be positioned within an inside cavity 230 of the receiver 140. In this example, the cavity 230 is formed by five connecting walls (two side walls, a top, a bottom and a back wall), which together form a box-shape with an open receiver face 240 positioned substantially towards the radiation 110 reflected upwards by the heliostats 120. Note that in this example, the receiver face 240 is configured substantially as a rectangle, however, any other suitable cross-sectional shape may function; e.g. square, circle, oval, etc. The plurality of panels 200 is positioned within the cavity 230 of the receiver 140 and spaced apart from one another to create spaces or passages between the panels 200. Each panel 200 may also be positioned substantially aligned with and parallel to a longitudinal axis.

Radiation 110 from the heliostats (not shown) may be directed towards the open receiver face 240 of the receiver 140, such that the rays or flux of the radiation 110 directly impinge upon portions of the outside surfaces 220 of the panels 200. As the radiation 110 impinges upon these surfaces 220, at least a portion of the radiation's energy may be absorbed as heat (thermal energy) by the material used to construct the panel, and this heat may then transfer (e.g. by conduction) to the heat transfer fluid flowing through the plurality of heat transfer fluid channels 210 configured within and/or forming each panel 200. Thus, energy from the radiation 110 from the heliostats 120 may be transferred as thermal energy to the low temperature heat transfer fluid 160, thus raising its temperature, resulting in the high temperature heat transfer fluid 170, which may be subsequently used in the power block to generate electricity. The panels 200 may be secured within the receiver 140 by any suitable means necessary, for example, by utilizing vertical and/or horizontal support beams (not shown), hangers, etc. and/or by securing the back longitudinal ends of each panel 200 to the back wall of the receiver 140.

FIG. 2 illustrates a cross-sectional view of each panel 200 to help visualize the heat transfer fluid channels 210, configured within these exemplary panels 200. However, this presentation of the panels 200, and their corresponding heat transfer fluid channels 210, is for illustrative purposes only. The actual fluid channels 210 of an actual receiver 140 in the field would not have open ends, and would instead, be configured to maintain the heat transfer fluid within the system. For example, actual heat transfer fluid channels 210 of an actual receiver 140 in the field would include some type of supply header (not shown) for supplying the low temperature heat transfer fluid 160 to each of the heat transfer fluid channels 210, and a return header (not shown) for receiving the high temperature heat transfer fluid 170, to return it to the power block to produce electricity. In addition, the open ends of the heat transfer fluid channels 210 shown in FIG. 2 (and later figures) would be connected in the field, either to a header, and/or to each other by 180-degree tubing and/or piping bends (for example, see FIG. 15C). Additional details regarding heat transfer fluid distribution (supply and return) will be provided later in this specification.

Figure 3:
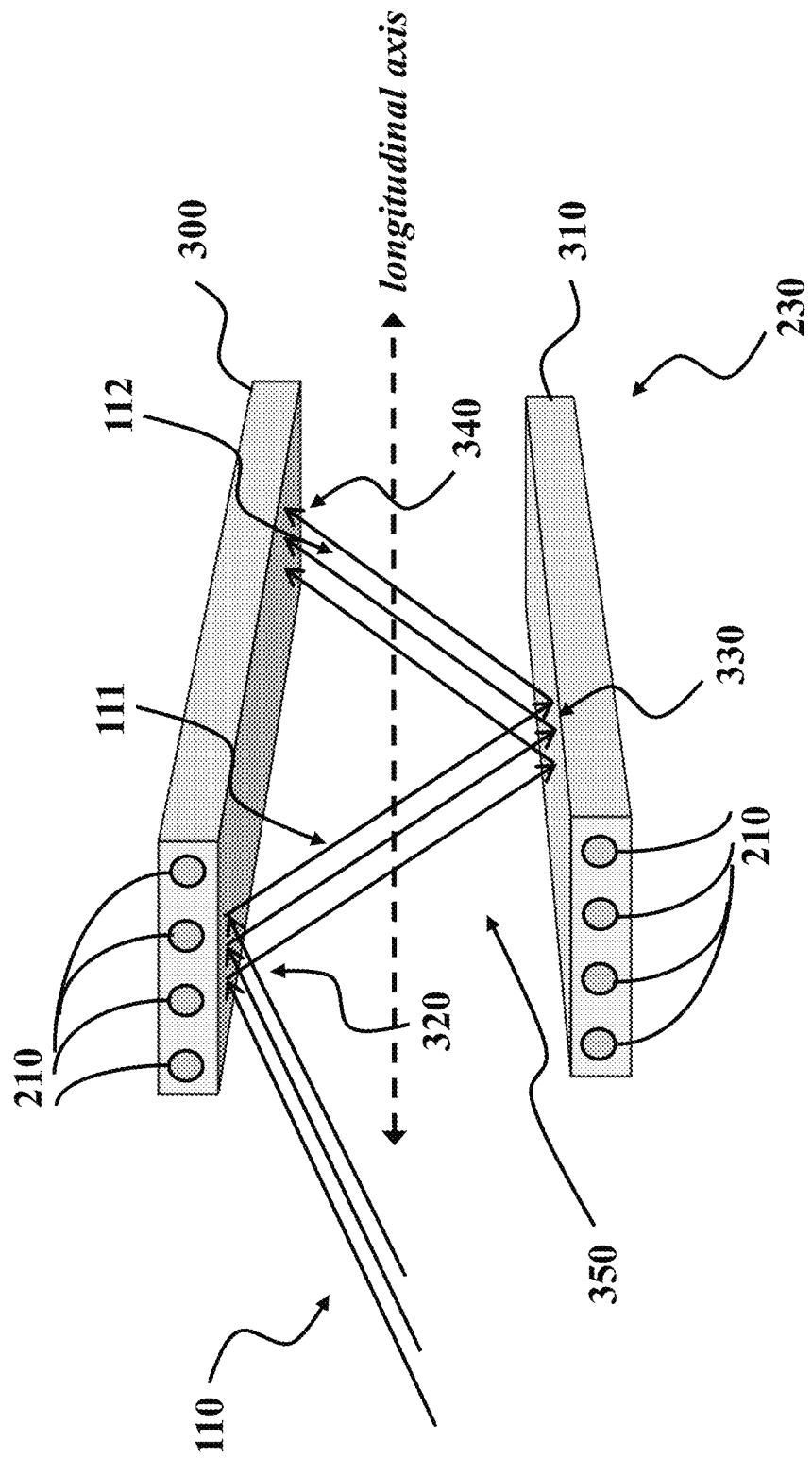
FIG. 3 illustrates the relationship of two panels for receiving radiation and transferring the energy from the radiation to a heat transfer fluid, according to exemplary embodiments of the present invention.

Some embodiments of the present invention include a receiver 140 designed to receive the radiation 110 from the heliostats 120, so that at least a portion of the radiation 110 impinging upon a surface 220 of a panel 200 may be reflected farther into the cavity 230 of the receiver 140 to be subsequently absorbed and/or partially reflected by other surfaces of the panels 200. In so doing, the amount of energy lost to the environment from the receiver 140 by convective, radiant, and/or reflective energy losses may be significantly reduced, if not eliminated altogether. FIG. 3 illustrates an example of how this may be achieved. Here, only two panels are shown, a first panel 300 and a second panel 310, both of which are positioned within the cavity 230 of a receiver (not shown). Both panels are aligned with and parallel to a longitudinal axis and are configured to form a space or passage 350 between them. The first panel 300 is configured so that the radiation 110 from the heliostats 120 (not shown) may directly impinge upon a first surface 320 of the first panel 300. In so doing, a portion of the energy contained in the radiation 110 may be absorbed and transferred as thermal energy to the heat transfer fluid flowing through the heat transfer fluid channels 210 of the first panel 300. However, a portion of the radiation 110 from the heliostats 120 may also be reflected from the first surface 320 of the first panel 300. This reflected radiation 111 may then travel farther into the cavity 230 of the receiver, through the passage 350, until the reflected radiation 111 intercepts a second surface 330, in this example, located on the second panel 310. A portion of the reflected radiation 111 may then be absorbed by the second panel 310, and transferred as thermal energy to the heat transfer fluid flowing through the heat transfer fluid channels 210 of the second panel 310. This process of receiving, absorbing, and reflecting radiation may be repeated numerous time, whereby each subsequent reflection directs the reflected light substantially farther into the cavity of the receiver 140, thereby minimizing the amount of energy lost from the receiver 140 to the surrounding environment.

FIG. 3 illustrates a third sequential reflection of radiation 112 from the second surface 330 of the second panel 310 to a third surface 340 located on the first panel 300. As before, a portion of the radiant energy contained in the reflected radiation 112 may then be absorbed as thermal energy by the first panel 300, such that the thermal energy may be transferred to the heat transfer fluid flowing through the heat transfer fluid channels 210. As a result of this repeated receiving, absorbing, and reflecting of radiation, a maximum amount of the radiation originally directed to the receiver 140 by the heliostats 120 may be transferred to the heat transfer fluid, minimizing losses to the environment, and maximizing the concentrating solar power system's 100 energy efficiency.

Figure 4:
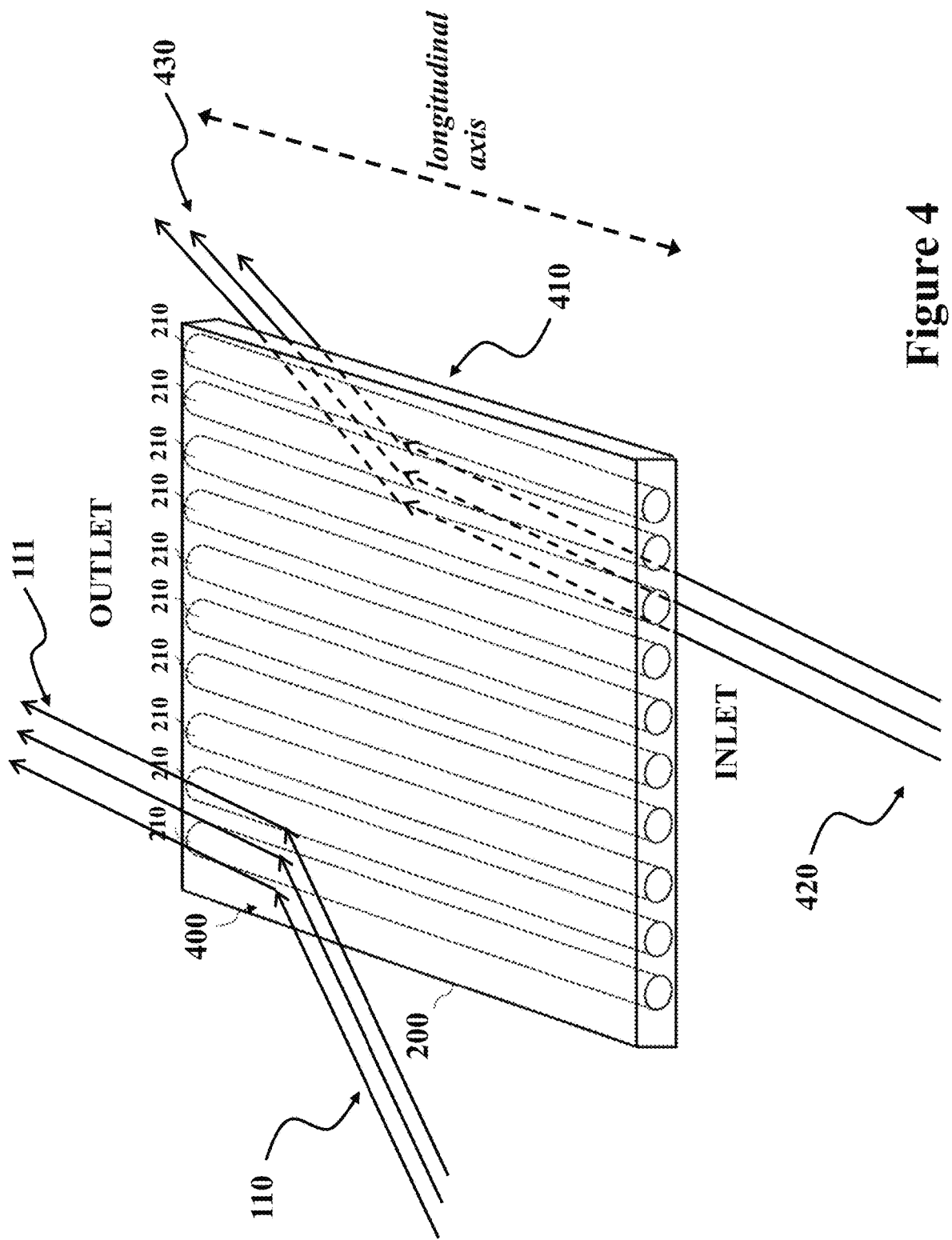
FIG. 4 illustrates the relationship of a plurality of heat transfer fluid channels with a panel, according to exemplary embodiments of the present invention.

FIG. 4 shows an exemplary panel 200, similar to those illustrated in FIGS. 2 and 3. In this panel design, a plurality of heat transfer fluid channels 210 are positioned within the panel 200, positioned between a first surface 400 and a second surface 410. In some embodiments, the spaces shown between the heat transfer fluid channels 210 and the top and bottom surfaces of the panel may be at least partially filled with some highly conductive material to facilitate better heat transfer from the surfaces of the panels to the heat transfer fluid flowing through the channels.

Radiation 110, either from the heliostats 120 and/or reflected radiation, impinges upon the first surface 400, whereby a portion of the energy contained in the radiation 110 may be absorbed by the panel 200 and transferred as heat to the heat transfer fluid channels 210 and subsequently to the heat transfer fluid (not shown) flowing through the heat transfer fluid channels 210. Not wishing to be bound by theory, the energy absorbed by the panel 200 may be transferred by conductive heat transfer through the material making up the panel 200, and subsequently to and through the material making up the heat transfer fluid channels 210, to heat the heat transfer fluid (not shown).

However, as illustrated in FIG. 4, additional radiation 420, either radiation from the heliostats 120 and/or reflected light from some other surface, for example from the receiver's inlet (not shown) or from within the receiver 140, may impinge upon the second surface 410 of the panel 200. As described above, at least a portion of the energy contained in the radiation 420 may be absorbed by the panel 200 and conducted through the panel 200 to the heat transfer fluid channels 210. Thus, more than one surface of a panel 200 may be utilized to receive and absorb radiation. For example radiation from neighboring passages may be absorbed by the same panel, where radiation from a first passage is absorbed by a "top" surface (e.g. surface 400) of the panel 200, and radiation from a second passage is absorbed by a "bottom" surface (e.g. surface 410) of the panel. As a result, the heat transfer fluid entering at the "inlets" of the heat transfer fluid channels 210, will exit at the "outlets" at a higher temperature. The direction of flow may be reversed in some embodiments.

FIG. 4 illustrates that multiple fluxes or rays of radiation 110 and 420, from multiple passages, may impinge upon different surfaces 400 and 410 of a panel 200. However, FIG. 4 simplifies the process significantly for reasons of clarity. In some embodiments of the present invention, multiple sources of radiation (or rays or fluxes) may enter into the passages or cavities between panels, resulting in the illumination of substantial amounts of the surface areas on both sides of the panels. This may maximize the amount of surface area of each individual panel receiving radiation, potentially reducing the total surface area required by the receiver to absorb the radiation delivered by the heliostats. Maximizing the surface area of the panels absorbing radiation and illuminating the panels on both sides may also minimize the formation of temperature gradients on and/or in the panels, and/or the formation of "hot-spots". Minimizing temperature gradients and "hot-spots" may reduce the magnitude of thermal and mechanical stresses experienced by the materials of construction utilized to manufacture the panels.

Figure 5:
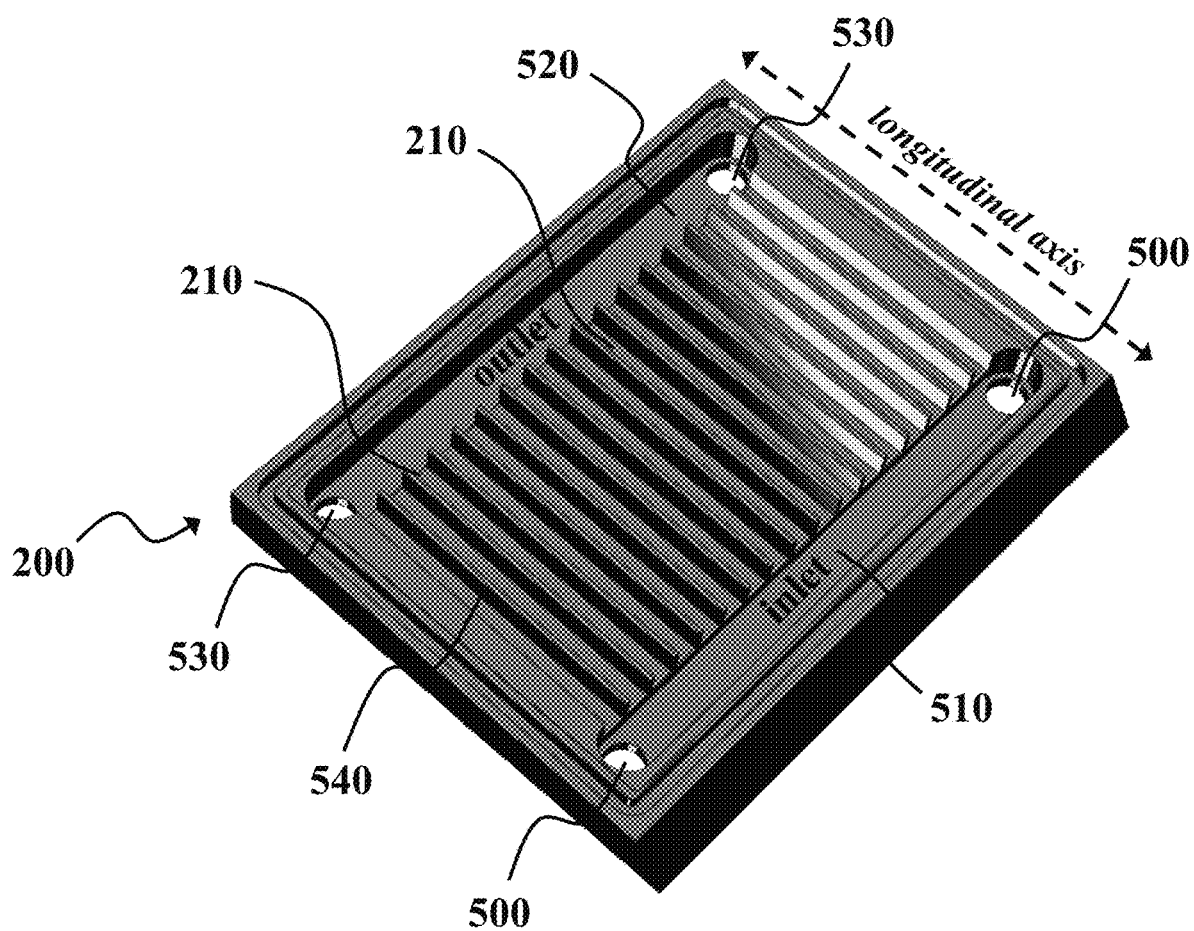
FIG. 5 illustrates the relationship of a plurality of heat transfer fluid channels with a panel, according to exemplary embodiments of the present invention.

FIG. 5 provides additional details for some embodiments of a two-part panel 200 constructed to include multiple heat transfer fluid channels 210 positioned between two surfaces, with one surface provided by each part. FIG. 5 only shows one part of the two-part panel 200. This part of the exemplary panel 200 includes a plurality of internal heat transfer fluid channels 210 formed by a plurality of parallel walls 540 substantially aligned along the longitudinal axis. Heat transfer fluid (not shown) enters a heat transfer fluid supply channel 510 through at least one heat transfer fluid supply aperture 500 (two shown). The supply channel 510 then distributes the heat transfer fluid to the plurality of heat transfer fluid channels 210. After flowing through the heat transfer fluid channels 210, the heat transfer fluid exits into a heat transfer fluid return channel 520 to subsequently exit the panel 200 through at least one heat transfer return aperture 530 (two shown). In this example, the first part of the panel 200 may be sealed from the environment to form a complete leak-free panel, by securing a flat sheet (the second part—not shown) on top of the first part of the panel 200 shown in FIG. 5. A fluid-tight seal may be formed by the use of a seal, gasket, or O-ring (not shown) placed in the indentation shown around the inside circumference of the first part of the panel 200. The two parts of the panel may then be secured in place using any suitable securing means (e.g. screws, welds, etc.) to create a complete panel. In this fashion, energy from radiation striking a surface of the panel 200 may be transferred to the heat transfer fluid entering the supply channel 510 on the "inlet" side, flowing through the heat transfer fluid channels 210, and exiting on the "outlet" side via the heat transfer fluid return channel 520, such that the heat transfer fluid exiting the panel 200 is at a higher temperature than its initial starting temperature. This high temperature heat transfer fluid may then be used to generate electricity in the power block (not shown). The direction of flow may be reversed in some embodiments.

Figure 6:
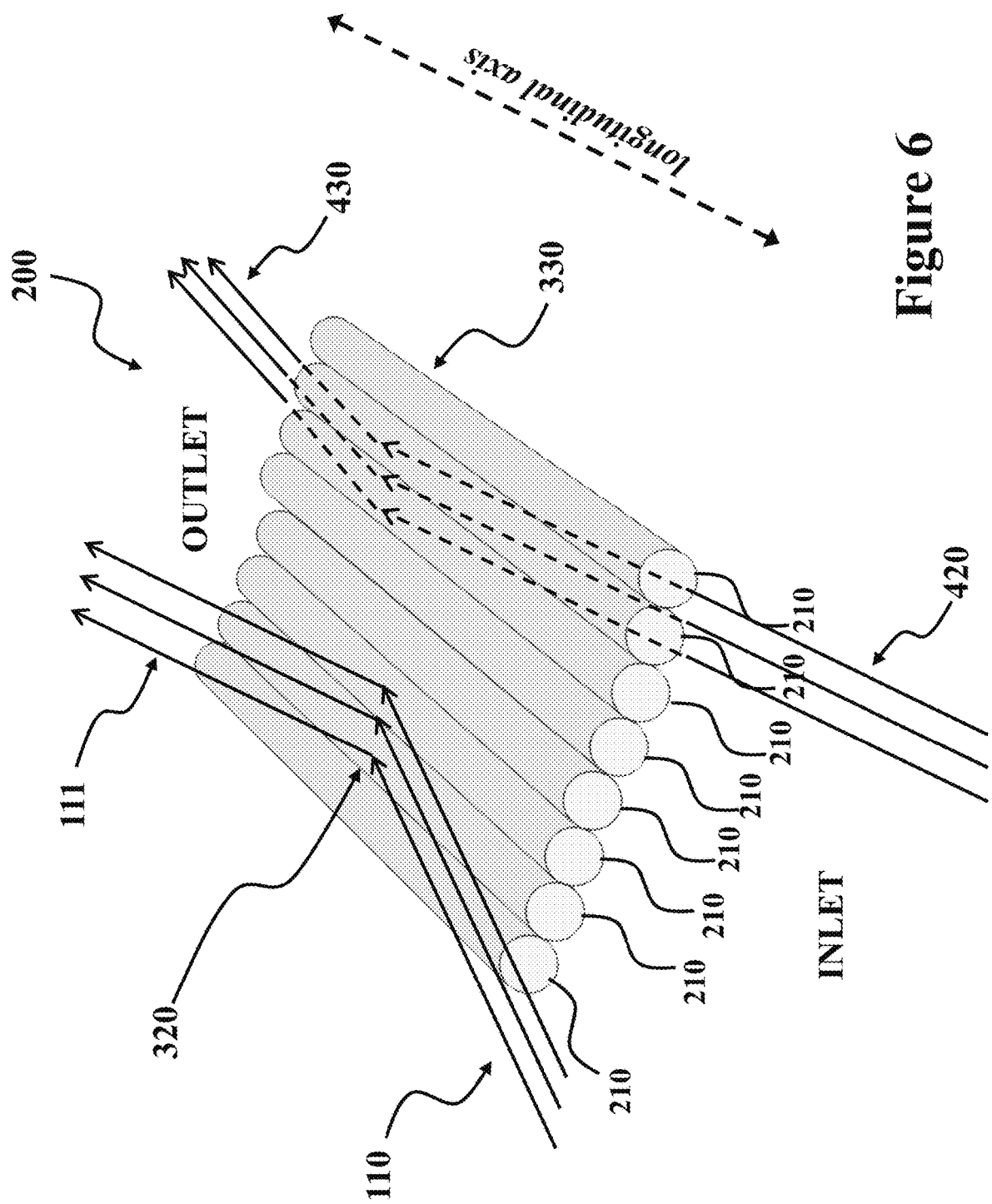
FIG. 6 illustrates the relationship of a plurality of heat transfer fluid channels with a panel, according to exemplary embodiments of the present invention.

FIG. 6 illustrates further embodiments of the present invention. In this example, a plurality of heat transfer fluid channels 210 is configured to form a panel 200, without the use of one or more separate outside surfaces; e.g. the outside surfaces of the heat transfer fluid channels 210 themselves create the outside surfaces that receive, absorb, and reflect radiation 110, 420. Each heat transfer fluid channel 210 may be a pipe, tube, and/or any other suitable conduit for transferring the heat transfer fluid through the panel 200. Each heat transfer fluid channel 210 may be aligned with and positioned parallel to a longitudinal axis. In some cases, each individual heat transfer fluid channel 210 may be positioned directly next to and in contact with its neighboring channels (as shown), such that the plurality of heat transfer fluid channels 210 form an essentially flat planar panel 200. In other examples, each individual heat transfer channel 210 may positioned with a gap between itself and its neighboring channels. In still further embodiments, the plurality of heat transfer fluid channels may be positioned to form any desirable planar surface; e.g. non-flat surface, wave-shaped, and/or any other suitable form.

FIG. 6, like FIG. 4, illustrates that both a first (e.g. top) surface 320 and a second (e.g. bottom) surface 330 may be configured to receive radiation, absorb radiant energy, and reflect radiation farther into the cavity of the receiver (not shown). As mentioned above, this is desirable to help utilize as much of the panel's outside surface area as possible for absorption, to help minimize the total surface area required by the receiver to absorb a defined amount of solar flux, to reduce temperature gradients, to reduce mechanical and thermal stresses, to maximize reflectance of radiation farther into the cavity of the receiver, and to minimize reflective, radiant, and convective energy losses to the environment. FIG. 6 illustrates a first flux of radiation 110 striking a first surface 320 (e.g. the top) of the panel 200. A portion of the energy contained in the radiation 110 may be absorbed by the panel 200 and transferred by conductive heat transfer to the heat transfer fluid flowing through the heat transfer fluid channels 210. Simultaneously, the reverse side of the panel 200 may receive a second flux of radiation 420 on a second surface 330. Again, a portion of the energy contained in the radiation 420 may be absorbed by the panel 200 and transferred by conductive heat transfer to the heat transfer fluid flowing through the heat transfer fluid channels 210. As a result, low temperature heat transfer fluid entering the panel on the "inlet" side of the heat transfer fluid channels may be heated to create a high temperature heat transfer fluid capable of generating electricity in a power block (not shown). In addition, each surface of a panel may absorb multiple different fluxes of radiation, at various different angles relative the surfaces receiving the fluxes. Exemplary materials of construction for the heat transfer fluid channels include metal alloys. Structures other than piping, tubing, and the like, for the heat transfer fluid channels include structures such as corrugated sheets with internal flow channels, mechanically or chemically etched micro-channels, dimpled sheets positioned against flat sheets, and/or any other suitable design for heat transfer. The direction of flow may be reversed in some embodiments.

Figure 7:
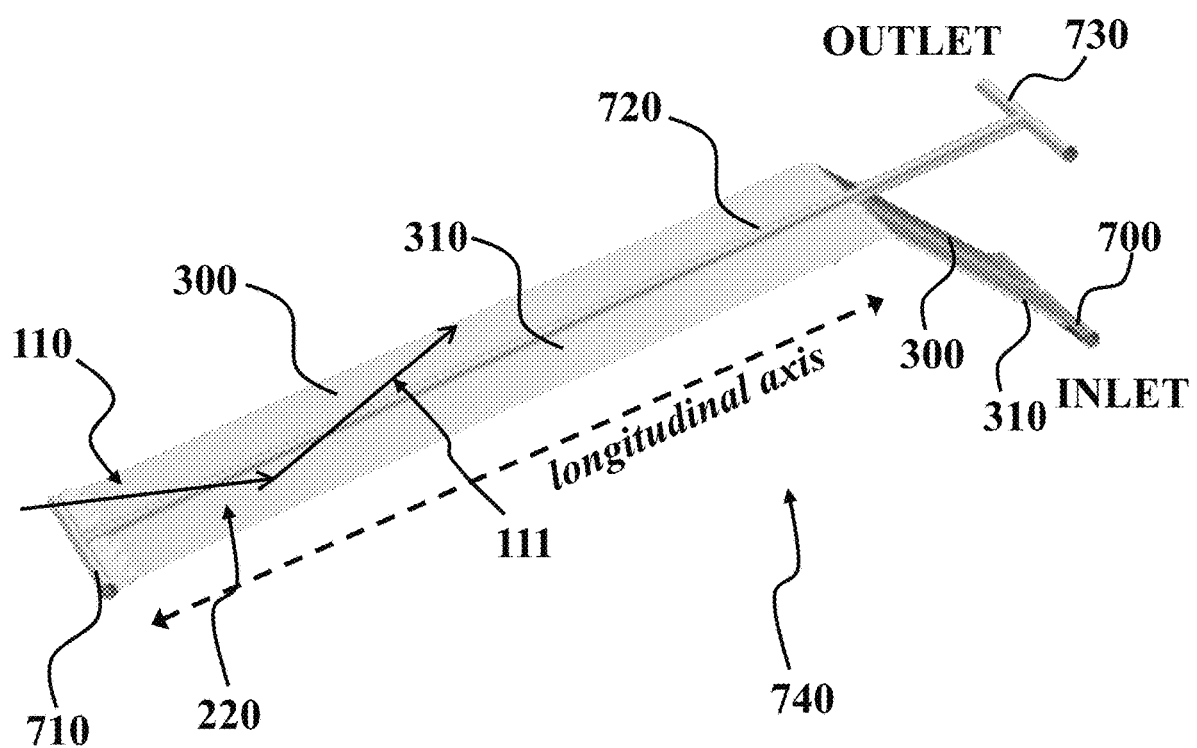
FIG. 7 illustrates a panel module constructed from two panels and including a heat transfer fluid distribution system, according to exemplary embodiments of the present invention.

FIG. 7 illustrates additional embodiments of the present invention, based on the panel design illustrated in FIG. 6. FIG. 7 shows an exemplary panel module 740 constructed from two panels 300 and 310, each including a plurality of heat transfer fluid channels with first portions aligned with and positioned parallel to a longitudinal axis and second portions angled downwards from the longitudinal reference axis. Low temperature heat transfer fluid may be supplied to panels 300 and 310 by a heat transfer fluid supply header 700 marked "inlet" (details follow in FIG. 8). Each individual heat transfer fluid channel may tie into the heat transfer fluid supply header 700 so that heat transfer fluid may flow through the angled portion of each channel, and subsequently through the section of heat transfer fluid channels aligned along the longitudinal direction shown in FIG. 7. During its transit through the channels, the heat transfer fluid may be heated by the radiation 110 striking surface 220 and any other surface on the panel module 740 absorbing radiation. The heated fluid may then be received by a heat transfer fluid return header 710, which transports the high temperature heat transfer fluid to the power block (not shown) through heat transfer fluid return headers 720 and 730. As will be shown later, a plurality of panel modules 740 may be stacked on top of one another, to form a plurality of passages between the panel modules 740. Such an arrangement may allow the reflected radiation 111 from the surface 220 of the second panel 310 of the panel module 740 to be received and absorbed by another panel module positioned above or below it (not shown). In addition, the direction of flow of the heat transfer fluid may be reversed in other embodiments of the present invention.

Figure 8:
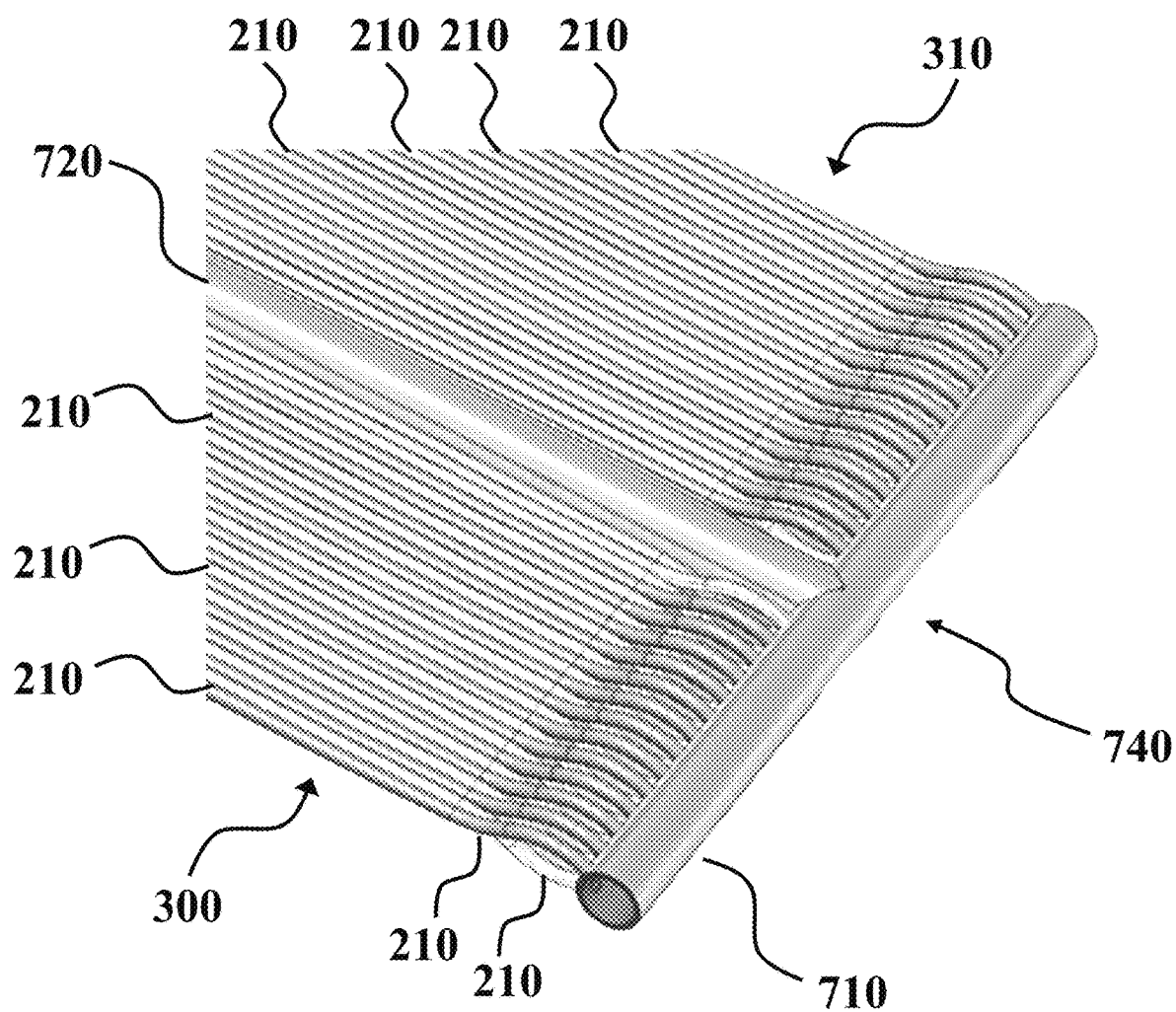
FIG. 8 illustrates exemplary design features for a panel module, including details for connecting heat transfer fluid channels to a heat transfer fluid return header, according to exemplary embodiments of the present invention.

FIG. 8 illustrates some exemplary details of a panel module 740 similar to the one shown in FIG. 7, but rotated 180 degrees in the horizontal plane formed by the panels and aligned with the longitudinal axis. FIG. 8 shows a first panel 300 and a second panel 310, each constructed from a plurality of heat transfer fluid channels 210, with each channel 210 terminating at a heat transfer fluid return header 710. The heat transfer fluid return header 710 receives the high temperature heat transfer fluid from each channel 210 and returns the fluid through the heat transfer fluid return header 720. FIG. 8 also illustrates an exemplary configuration for terminating each heat transfer fluid channel 210 at the heat transfer fluid return header 710. In this configuration, each channel's connection to the return header 710 alternates from a high position to a low position, with a first channel positioned relatively high on the header, and a second channel positioned relatively low on the header. This alternating pattern of a high channel, and a low channel, may facilitate easier fabrication (e.g. welding) of the panel module 740, especially for designs that minimize the gap and/or spacing between adjacent heat transfer fluid channels 210. A similar configuration may be used for connecting heat transfer fluid channels to a heat transfer fluid supply header. In some embodiments, heat transfer fluid may flow through a system as illustrated in FIG. 8, but in the reverse direction.

Figure 9:
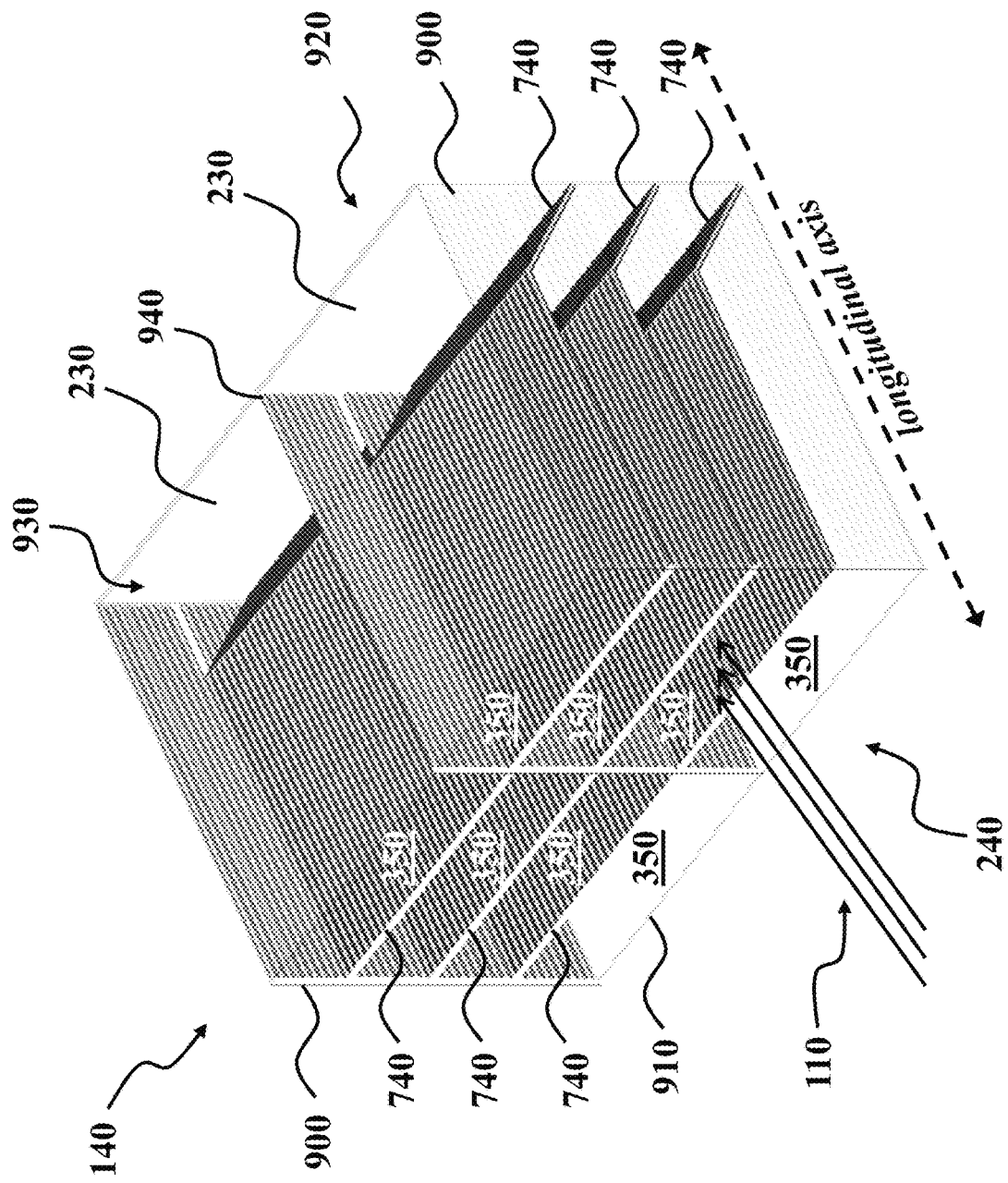
FIG. 9 illustrates a receiver for a solar concentrating power plant, constructed from a plurality of panel modules, according to exemplary embodiments of the present invention.

FIG. 9 illustrates some embodiments of the present invention for utilizing panel modules 740 similar to the one described in FIG. 7 to construct a receiver 140 for a concentrating solar power system 100. In this example, two stacks of three panel modules 740 per stack are positioned adjacent to one another to construct a receiver 140. In this example, the receiver 140 is shaped as a rectangular box, with an outer structure built from a base panel 910, a top panel 930, a back panel 920, and two side panels 900. The various outside panels frame an open receiver face 240 oriented towards the heliostats to receive the incoming flux of radiation 110. All or some of the panels may be constructed from a plurality of heat transfer fluid channels. Note that the side panels 910 illustrated in this example include heat transfer fluid channels, whereas the base panel 910 and the back panel 920 are not. The top panel 930 is illustrated as transparent to facilitate visualization of the underlying panel modules 740. As will be described below in more detail, panels constructed with heat transfer fluid channels are referred to as "active" panels, whereas panels without are referred to as "passive" panels.

The assortment of outside panels (900, 910, 920, and 930), active or passive, used to construct a receiver 140 creates an internal cavity 230. In this example, the internal cavity 230 is further separated into eight separate passages 350. These passages 350 are formed by combining two stacks of panel modules 740, with three panel modules 740 per stack oriented in a horizontal direction, with the two stacks separated by a vertically positioned bisecting panel 940. The bottom two passages 350 are completed by the base panel 910, and the top two passages 350 are completed by the top panel 930. Thus, the plurality of panels utilized to construct the exemplary receiver 140 shown in FIG. 9 create a total of eight fully enclosed passages 350, with the exception of the front open receiver face 240. Radiation 110 entering any one of the passages 350 will not be reflected into any of the other passages 350. Instead, the radiation 110 entering a particular passage 350 will be repeatedly directed to various surfaces within that particular passage 350, and portions of the radiation 110 will be absorbed and reflected at each surface receiving radiation until most, if not all, of the energy contained in the radiation originally entering the receivers from the heliostats is absorbed by the panels. As a result most, if not all, of the energy contained in the radiation delivered by the heliostats to the receiver 140 will be transferred to the heat transfer fluid flowing through the heat transfer fluid channels (not shown) of the panels, to create a high temperature heat transfer fluid suitable for generating electricity in a power block (not shown).

FIG. 9 illustrates that the eight passages 350 share panels with one another. For example, the vertical bisecting panel 940 is shared by the left stack of four passages 350 and the right stack of four passages. Similarly, most of the horizontal panels of the panel modules 740 are shared by an upper passage and a lower passage. Thus, most of the panels used to construct the receiver 140 receive, absorb, and reflect radiation 110 from multiple surfaces (e.g. top, bottom, sides). As a result, the fraction of each panel's total surface area receiving, absorbing, and reflecting radiation is maximized, temperature gradients are minimized, and physical and thermal stresses within the various receiver components are minimized.

FIGS. 7 and 9 also illustrate an exemplary feature of a panel module 740, where the individual panels include portions of panels angled away from the longitudinal axis to a non-parallel position. The angle of these angled panel portions relative to the portions aligned with the longitudinal axis, is referred to as the panel module bend angle. At least one reason for angling the modules in this manner is to maximize the amount of radiation that impinges on the panels, thus minimizing the amount of radiation that strikes the back panel 920. In other words, radiation that reaches the deepest parts of a passage 350 will be more likely to strike the angled portions of the panel modules, rather than striking the back panel 920. This will facilitate more complete capture of the radiation entering each passage, and will minimize reflective losses to the environment, for example from the back panel 920. In addition, the angled portions of a panel module, where the angled portions are positioned towards the back of the receiver cavity, may minimize radiation losses from the back panel to the outside environment. Alternatively, panel modules may be constructed without an angled portion. In such cases, it may be desirable to utilize and active back panel 920 to facilitate the capture of any remaining radiation that reaches the deepest recesses of a particular passage 350.

Figure 10:
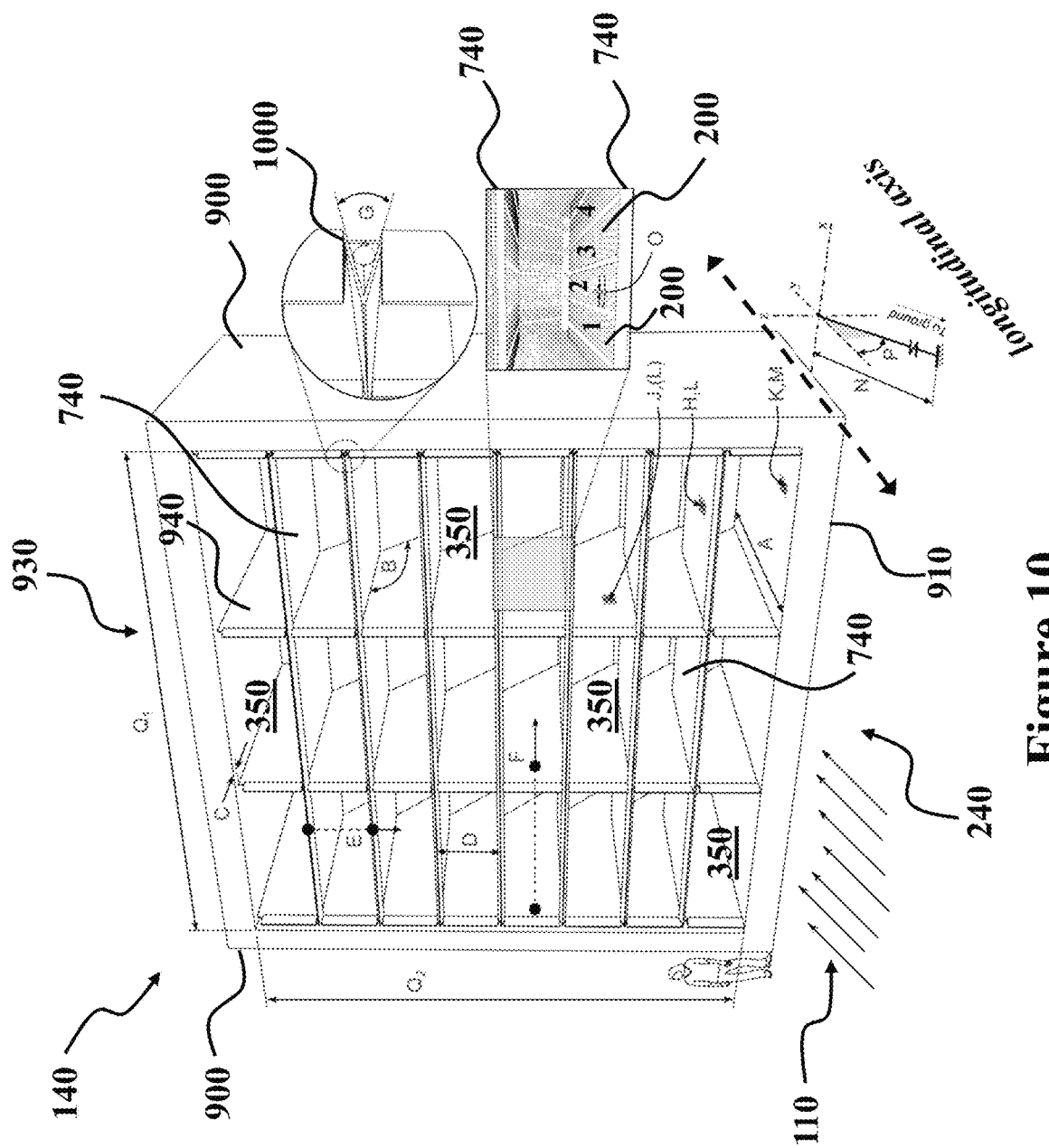
FIG. 10 illustrates further design details for a receiver similar to the receiver shown in FIG. 9, according to exemplary embodiments of the present invention.

FIG. 10 shows another embodiment of a receiver 140, which includes three adjacent stacks of panel modules 740, with seven panel modules 740 per stack. Each stack also includes a base panel 910 and a top panel 930. The receiver's basic rectangular shape is completed by two side panels 900 and a back panel (not shown). Any one or all of the base panel 910, the top panel 930, the side panels 900, and the back panel may be passive or active panels. The various outside panels frame an open receiver face 240 oriented towards the heliostats to receive the incoming flux of radiation 110. Each panel module 740 includes an angled portion towards the back wall portion of each passage 350, with a panel module bend angle B ranging from about 90 degrees to about 180 degrees (relative to the longitudinal axis). FIG. 10 also illustrates a perspective view looking down the longitudinal axis of one of the passages 350. This view shows an exemplary passage 350 formed by two panel modules 740, a vertically bisecting panel 940, and a side panel 900, where each panel module 740 includes at least four interconnecting panels 200 (numbered 1-4 for the "bottom" panel module). Together, this arrangement of panel modules 740, side panel 900, and vertically bisecting panel 940 form a channel or passage 350, which is closed except for the open front face 240 that allows the radiation from the heliostats to enter the passage 350. Thus, radiation 110 entering at an angle relative to the longitudinal axis will impinge upon these panels/surfaces. Some of the radiation will be absorbed, with the remainder reflected further into the depths of the cavity. Reflected radiation (not shown) that reaches the angled portions of the panel modules 740 will either be absorbed or reflected down below the lower panel module's horizontal plane, to be absorbed by the panels/surfaces located below this plane. Thus, the amount of energy in the incoming radiation 110 lost to the environment due to convection, radiation, and/or reflectance is minimized.

FIG. 10 illustrates further potential design criteria for a receiver 140. A receiver 140 may be defined by a number of different design criteria including, but not limited to, total receiver depth A, panel module bend angle B, panel module offset length C (e.g. relative to the outward facing open face of the receiver formed by the side panels, top panel, and bottom panel), passage height D, total number of vertically stacked passages E, total number of horizontally positioned passages F, radiation shield angle G (more on this later in this specification), horizontal surface reflectance H, vertical surface reflectance J, passive surface reflectance K (more on this later in this specification), surface specularity L, passive surface specularity M, tower height (receiver midpoint) N, heat transfer fluid channel outer diameter O, and receiver aspect ratio Q ($Q_2/Q_1$).

A particular receiver design will depend on the design of the heliostat array positioned around the tower (not shown) and receiver. For example, the receiver 140 shown in FIG. 10 could be for a semicircular array of heliostats positioned in an approximate 180 degree arc around the receiver. Alternatively, two receivers similar to the one shown in FIG. 10 could be placed with their back panels facing each other (or without any back panels) and with their open faces oriented 180 degrees from each other to face opposite directions. Such a "two-receiver" configuration may enable a heliostat array with a plurality of heliostats positioned in an approximate 360 degree arc around the two receivers.

Each specific metric summarized in FIG. 10 may also depend upon the overall design for a particular heliostat array. The following ranges for each of the receiver design metrics are provided for illustrative purposes. For example, the total receiver depth A may range from about 3 feet to about 20 feet. The panel module bend angle B may range from about 90 degrees to about 180 degrees. The panel module offset length C may range from about 1 inch to about 3 feet. The passage height D may range from about 6 inches to about 6 feet. The total number of vertically stacked passages E may range from 2 to 20. The total number of horizontally positioned passages F may range from 2 to 20. The heat transfer fluid channel outer diameter O may range from about half an inch to about 6 inches. The receiver aspect ratio Q may vary from about 0.2 to 5.

FIG. 10 also illustrates that the entire receiver 140 may be positioned at an angle relative to the true horizontal plane defined by the ground upon which the heliostats are positioned. In other words, the receiver may be tilted by orienting its longitudinal axis relative to the ground and/or some other fixed reference plane. This angle is referred to as the receiver tilt angle P. The receiver tilt angle P may range from about 0 degrees to about 45 degrees, below horizontal or some other fixed reference plane, as shown in FIG. 10.

Figure 11A:
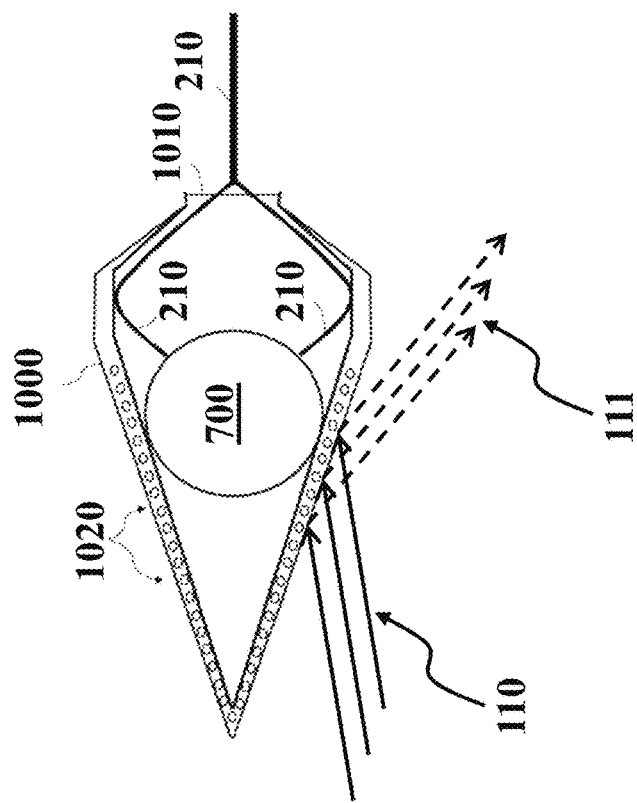
FIGS. 11A and 11B illustrate radiation shields, optional elements for receivers, according to exemplary embodiments of the present invention.
Figure 11B:
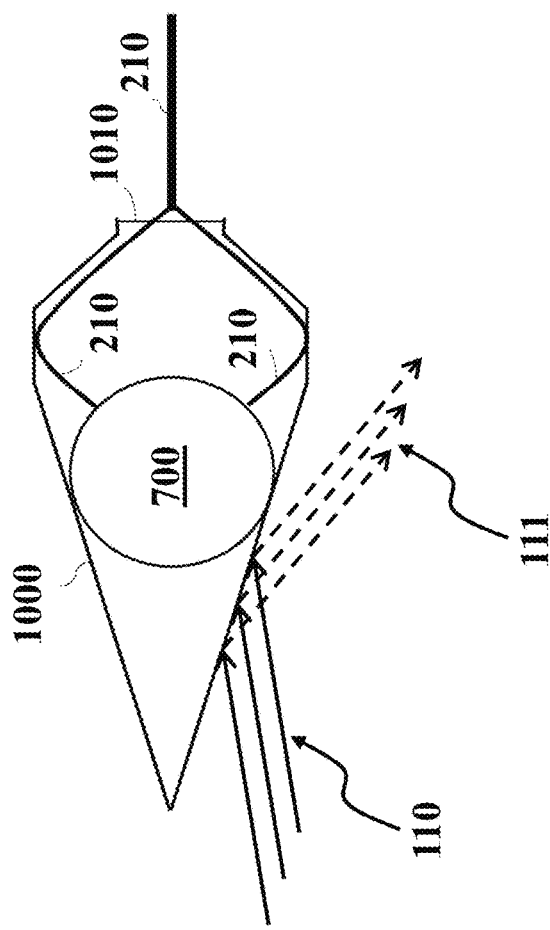

FIG. 10 also illustrates a radiation shield 1000, details of which are provided in FIGS. 11A and 11B. In some embodiments, a heat transfer fluid supply header 700, and/or other piping or necessary conduit (e.g. could also be a return header), may positioned such that they are directly exposed to the incoming radiation 110 from the heliostats (not shown). This direct exposure may overheat the heat transfer fluid supply header 700, potentially to the point of failure. Radiation shields 1000 may protect the heat transfer fluid supply header 700 (and any other receiver elements) from this direct exposure, and from overheating, by maximizing reflection of the incoming radiation 110 into the internal passages and/or cavities of the receiver. This reflected radiation 111 may then be subsequently distributed and absorbed onto multiple surfaces located further within the passage/cavity, eliminating or reducing the formation of "hot-spots" at either the front facing surfaces of the receiver and/or elsewhere within the receiver. FIGS. 11A and 11B show examples where radiation shields 1000 are positioned over the heat transfer fluid supply header 700 and the heat transfer fluid channels 210 that transport the heat transfer fluid throughout the receiver. A radiation shield 1000 may be secured in place by any suitable fastener 1010, for example a tension fastener.

In some embodiments of the present invention, a radiation shield 1000 may be actively cooled by a cooling fluid as illustrated in FIG. 11B. For example, the walls of the radiation shield 100, facing the incoming radiation 110, may be in direct contact with cooling channels 1020 that transport and circulate a cooling fluid, which may remove heat absorbed by the radiation shield 1000, thus preventing the conduction of the absorbed heat to the header 700 and/or heat transfer fluid channels 210 and/or preventing the overheating and degradation of the optical quality of the radiation shield surfaces (e.g. its reflective properties). An example of a suitable cooling fluid is a water plus glycol mixture. In addition a radiation shield 100 may include a reflective coating with a suitable specularity to help maximize deflection of the incoming radiation 110. Alternatively, the cooling fluid flowing through cooling channels 1020 may be identical to the heat transfer fluid. This example would help minimize energy losses from the system, by capturing radiant energy in the heat transfer fluid, which can then be utilized in the power block (not shown) to generate electricity, rather than loosing that energy to a cooling fluid. Exemplary materials of construction for the cooling channels include metals and/or metal alloys. Structures other than piping, tubing, and the like, for the cooling channels include structures such as corrugated sheets with internal flow channels, mechanically or chemically etched microchannels, dimpled flat sheets positioned against flat sheets, and/or any other suitable device for heat transfer.

Figures 12A, 12B:
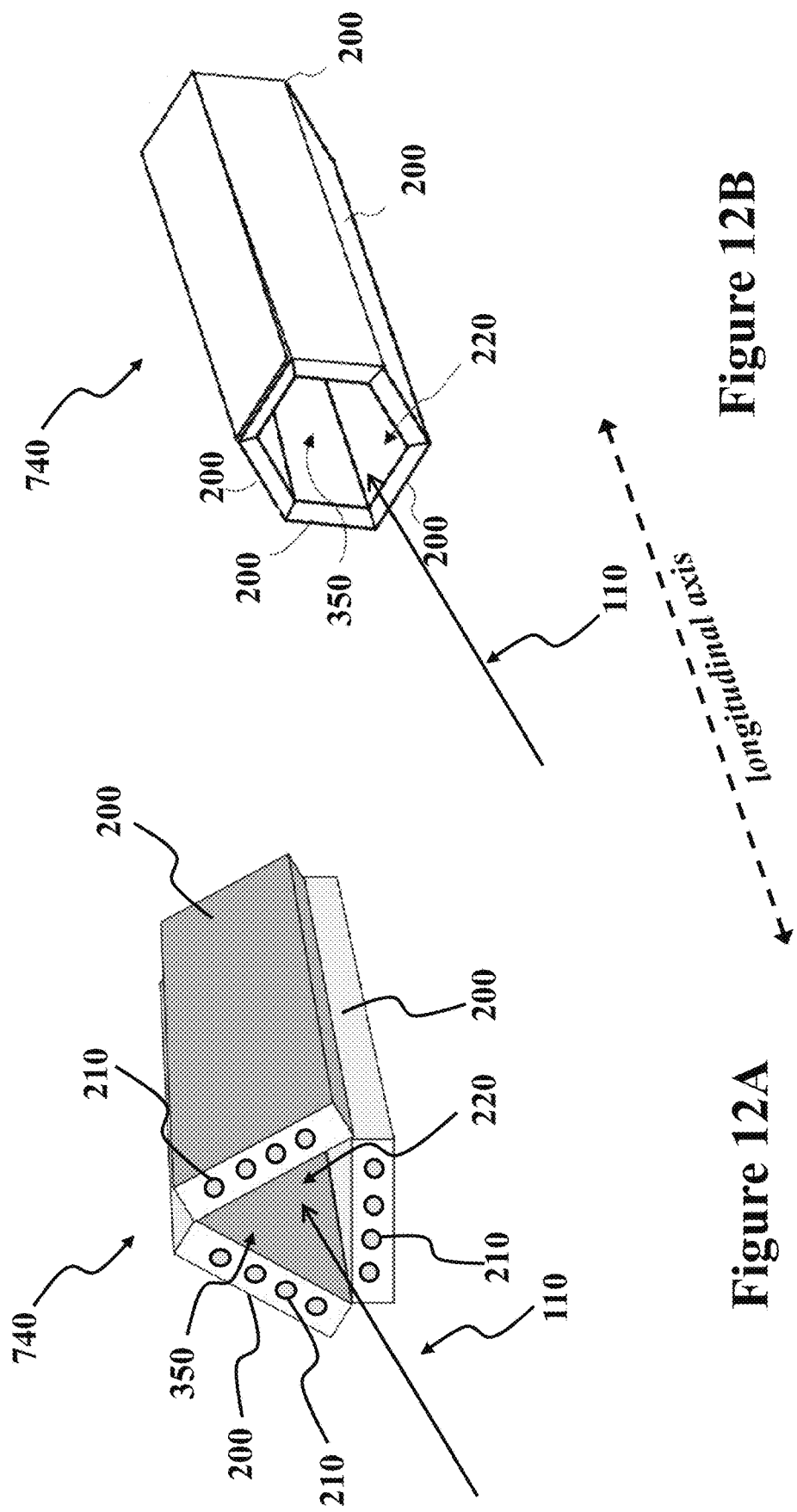
FIGS. 12A and 12B illustrate different geometric configurations for panel modules and/or cavities/channels, according to exemplary embodiments of the present invention.
Figures 13A, 13B:
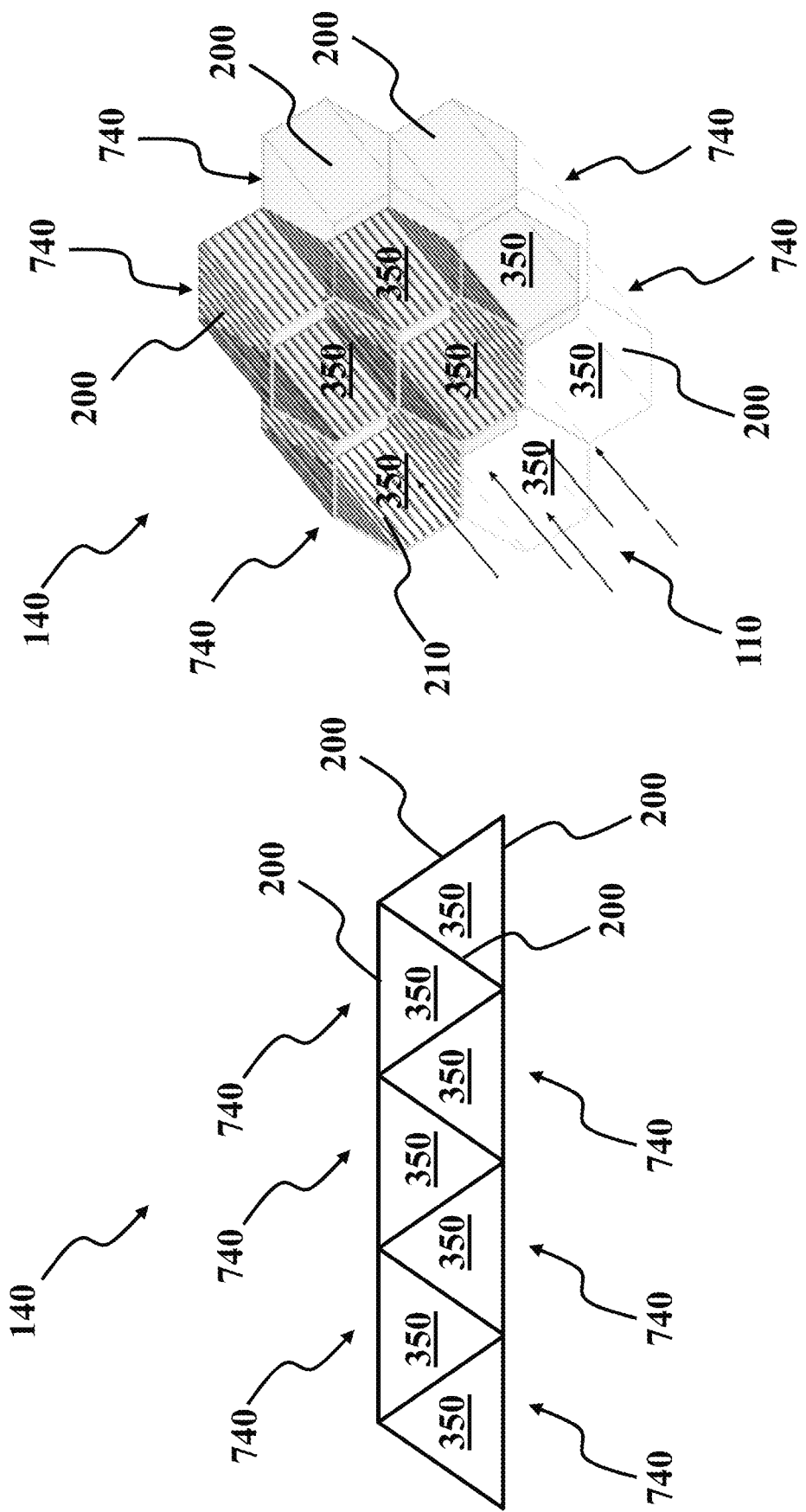
FIGS. 13A and 13B illustrate different receiver configurations, resulting from the different geometric configuration for panel modules shown in FIGS. 12A and 12B, according to exemplary embodiments of the present invention.

FIGS. 9 and 10 illustrate receivers 140 constructed from panel modules 740 positioned to form rectangular or square passages 350. However, other geometric shapes may also be desirable. FIGS. 12A and 12B illustrate two additional examples of panel modules 740, a triangular configuration and a hexagonal configuration respectively. A triangular configuration utilizes the minimum number of interconnecting panels 200, three, to provide a closed passage 350 that is separated from neighboring passages (not shown) by its panels 200. Therefore, radiation 110 entering the passage 350 of a triangular panel module 740, through the receiver's front open face, will not be directly reflected into a neighboring passage (see FIG. 13A). A receiver 140 may be constructed using a triangular configuration, for example, by aligning a plurality of triangular panel modules 740 with and parallel to the longitudinal axis, with one panel 210 from each panel module 740 positioned in the horizontal plane (as shown in FIG. 12A, oriented as a pyramid), and with the apexes of neighboring triangles touching. In this fashion, a row of triangular panel modules 740 may be formed, each with an upward directed apex. A second identical row may then be formed by connecting each upward directed apex to its neighboring upward directed apex by a panel that spans the distance between them. Just the open faces of the passages 350 of an exemplary two row receiver 140, constructed from seven triangular panel modules 740, is illustrated in FIG. 13A. Note that FIG. 12A illustrates panels 200 constructed with a plurality of heat transfer fluid channels 210 sandwiched between two surfaces. However, this configuration is for illustrative purposes only, and the panels 200 may be constructed in any of the other fashions described herein (e.g. FIGS. 5 and 6), or other suitable designs. Also note that FIG. 13A illustrates each panel 200 without any thickness dimension, for the purpose of providing a simplified figure.

FIG. 12B illustrates an exemplary hexagonal configuration of a panel module 740, constructed of six connecting panels 200, to form a closed passage 350 that is separated from neighboring passages (not shown) by its panels. Therefore, radiation 110 entering the passage 350 of a hexagonal panel module 740, through the receiver's front open face, may not be directly reflected into a neighboring passage. An exemplary "honey-comb" receiver 140 configuration, constructed from seven hexagonal panel modules 740, is illustrated in FIG. 13B. Note that FIG. 13B illustrates panels 200 constructed with a plurality of heat transfer fluid channels 210, without outside surfaces, similar to what is shown in FIG. 6. However, this configuration is for illustrative purposes only, and the panels 200 may be constructed in any of the other fashions described herein (e.g. FIGS. 4 and 5), or other suitable designs. Also note that FIG. 13B illustrates each panel 200 without any thickness dimension, for the purpose of providing a simplified figure.

Figure 14:
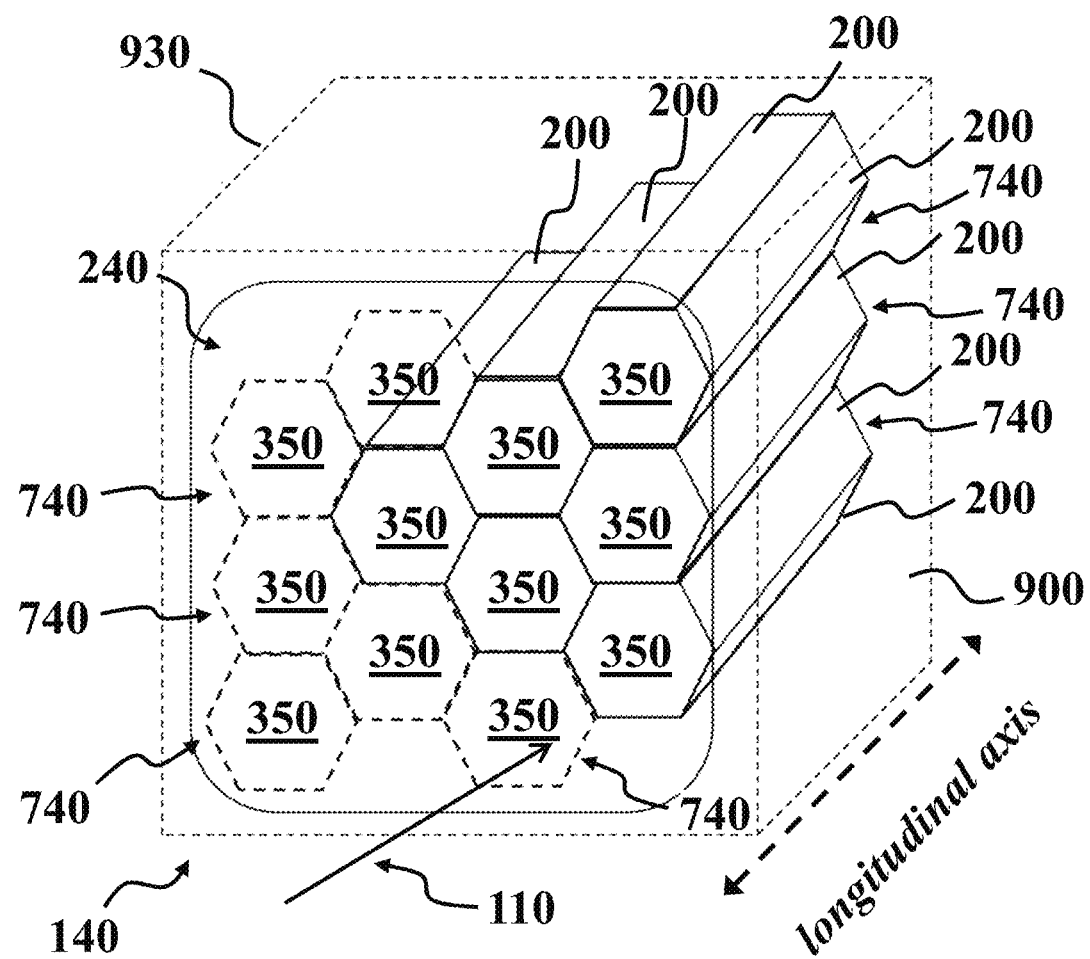
FIG. 14 illustrates a receiver constructed from multiple hexagonal panel modules, according to exemplary embodiments of the present invention.

FIG. 14 provides additional detail for a receiver 140 constructed from 12 hexagonal-configured panel modules 740. The receiver 140 is in a box-shape, formed by a top panel 930, two side panels 900 (only one shown), a back panel (not shown), and a base panel (not shown), which together frame the receiver's front open face 240. Radiation 110 enters the plurality of passages 350, through the receiver face 240, at a predefined receiver tilt angle P. Six interconnecting panels 200, which together constitute a panel module 740, form each passage 350. Note that neighboring panel modules share at least one panel with each other. Similarly, neighboring passages 350 share panels 200, such that both sides of any given panel 200 may receive radiation 110 and/or reflected radiation (not shown). As described above, absorption of radiation from multiple sides of a panel 200 will minimize the formation of temperature gradients and/or "hot-spots". In some embodiments of the present invention, each receiver panel 200 may function as a near-blackbody. As a result, the receiver 140 may achieve operating temperatures in excess of 650° C. while minimizing thermal losses to the environment to less than 10% (defined as the ratio of energy delivered to the heat transfer fluid divided by the total energy that enters the receiver aperture), and while minimizing thermal and/or mechanical stresses to the equipment (thus potentially reducing the amounts of material, and associated costs, to construct the receiver). Note that FIG. 14 illustrates each panel 200 without any thickness dimension, for the purpose of providing a simplified figure. Of course, other panel module geometric configurations may be used including, but not limited to, diamond-shaped, square, and/or any other suitable polygon-shaped geometry.

Figure 15B:
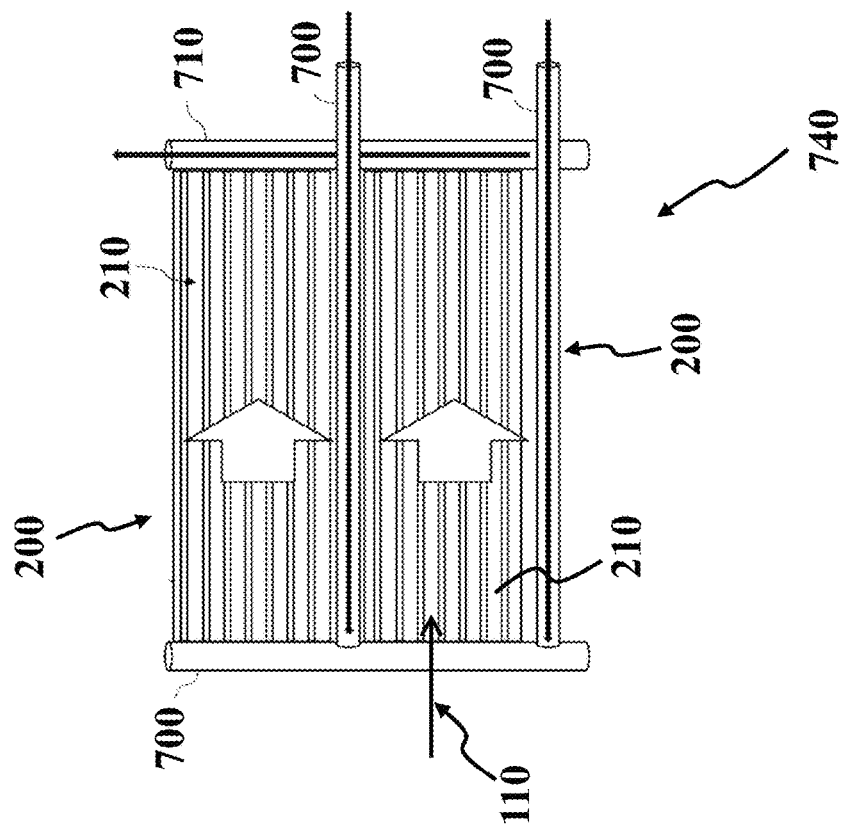
Figure 15A:
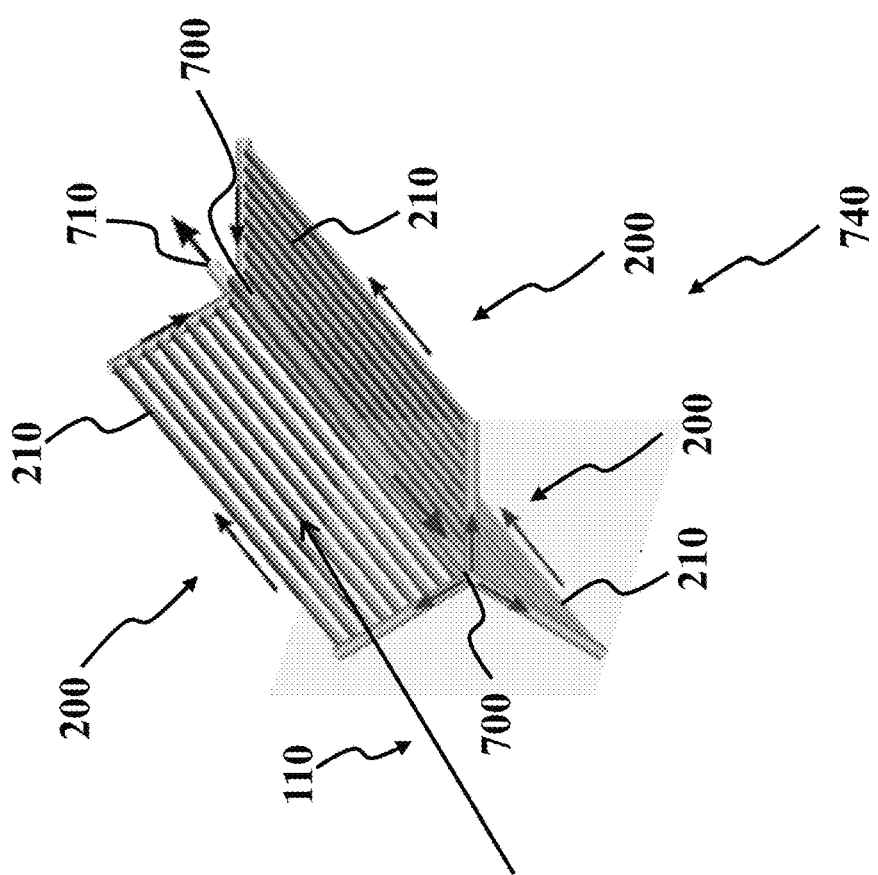

FIGS. 15A-D illustrate embodiments for distributing heat transfer fluid to and from the panels 200 used to construct a receiver 140, to convert low temperature heat transfer fluid to high temperature heat transfer fluid. FIG. 15A shows the direction of the flow of heat transfer fluid (as indicated by the errors) through a panel module 740 constructed of three panels 200. Each panel 200 is constructed from a plurality of heat transfer fluid channels 210. In this example, each individual heat transfer fluid channel is separated from its neighbors by a slight gap. Alternatively, the heat transfer fluid channels could be in direct contact with one another. Each panel 200 shares an edge with a common heat transfer fluid supply header 700 that supplies a low temperature heat transfer fluid to the panels. The common heat transfer fluid supply header branches into three separate branches, one for each panel 200, where each individual heat transfer fluid channel 210 is fed low temperature heat transfer fluid. The heat transfer fluid then flows through the entire length of each heat transfer fluid channel, absorbing thermal energy in the process, to exit as high temperature heat transfer fluid into a heat transfer return header 710. As with the supply header 700, each panel 210 has its own dedicated heat transfer return header branch. Each branch then terminates in a common heat transfer return header 710, which ultimately returns the high temperature heat transfer fluid to the power block to generate electricity. The shaded vertical plane illustrated in FIG. 15A indicates the side from which incoming solar flux would enter the panel module 740. In some embodiments, the low temperature heat transfer fluid may enter the heat transfer supply header 700 at a relatively cool fluid temperature, for example less than or equal to about 500° C. Providing this relatively cool heat transfer fluid to the side of the panel module 740 closest to the incoming radiant flux from the heliostats may help to minimize the operating surface temperatures of this side of the panel module 740, which may in turn help to minimize infrared re-radiation and convection heat losses to the environment. During flow through the heat transfer fluid channels 210, the heat transfer fluid receives at least part of the radiant energy absorbed by the panels 200 and the resultant heat transfer fluid exits at the back of the panel module 740 at a higher temperature than the entering fluid, for example greater than or equal to about 650° C. Since the hotter heat transfer fluid return header 710, in this example, is positioned towards the back portions of the passages formed by the panel module, re-radiation from the panels 200 will likely be reabsorbed by the panels 200 also positioned in the back portions of the passages, thus minimizing radiation and convective losses from the hot heat transfer fluid return header 710 to the environment.

FIG. 15B provides another possible configuration for supplying and returning heat transfer fluid to and from the panels 200 and/or panel modules 740 of receiver 140. In FIG. 15B, a heat transfer fluid supply header 700 supplies low temperature heat transfer fluid to two panels 200, in this case, through two individual pipes, although one or more could be used. In this case, the supply header 700 stems from the back portion of the receiver. Both supply header pipes terminate in a single heat transfer fluid supply header 700 positioned towards the front of the panels 200, in the region where the incoming radiation 110 enters the receiver. The relatively low temperature heat transfer fluid is then distributed to each of a plurality of heat transfer fluid channels 210. The heat transfer fluid then flows from the front, through the entire length of the channels 210 to the back region of the panels 210 where the now higher temperature heat transfer fluid is collected and transported to the power block by a heat transfer fluid return header 710. Similar to FIG. 15A, FIG. 15B also provides the potential benefit of providing the lowest temperature heat transfer fluid to surfaces of the receiver that are exposed to both ambient conditions and the highest concentration of radiation from the heliostats. Thus, these configurations, and others similar to them, may significantly avoid detrimental heat losses to the environment due to convective and/or radiant energy losses. In addition, the relatively low temperature heat transfer fluid supply header 700 may be positioned to receive the highest density of incoming radiation 110, while higher temperature section components will be exposed to lower densities of reflected radiation (not shown). Thus, configurations like those illustrated in FIGS. 15A and 15B may provide a complementary effect of inverting the magnitude of the radiation impinging upon a particular surface with the magnitude of the heat transfer fluid temperatures and panel skin temperatures present at those particular surfaces. This complementary effect may in turn reduce the physical and/or thermal strains experienced by the panels, potentially allowing the use of lower-cost metals in the production of receiver.

Figures 15C, 15D:
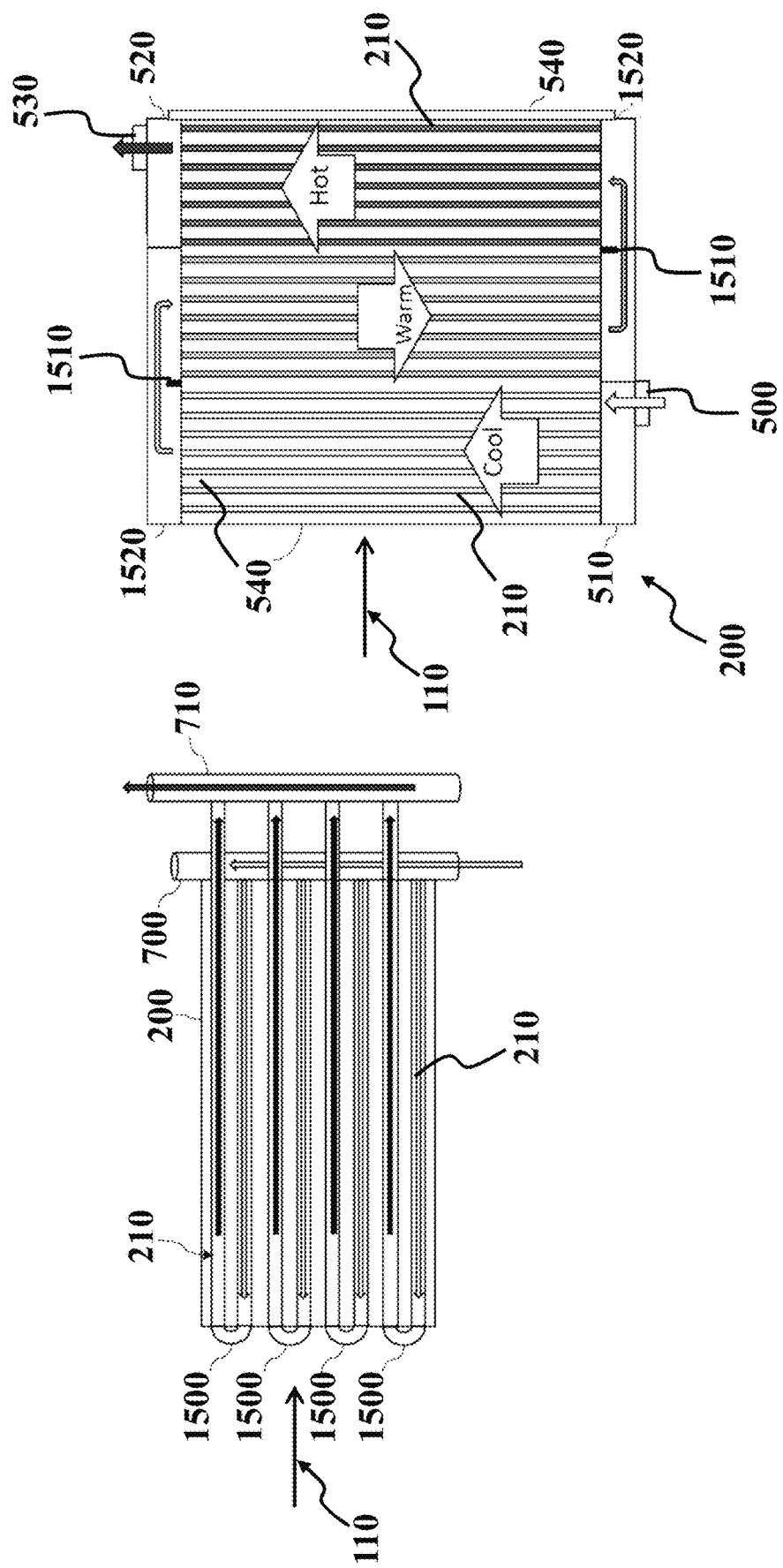

In some cases more than a single-pass of a heat transfer fluid through its respective heat transfer fluid channels, and through a panel, may be desired. FIG. 15C provides a two-pass design, for example, to attain higher final heat transfer fluid temperatures and/or to reduce the total surface area required for a given panel, panel module, and/or receiver design. FIG. 15C illustrates a single panel 200 embodiment where both the heat transfer supply header 700 and the heat transfer fluid return header 710 are placed in the back of the passage and/or cavity formed by the various panels used to construct the receiver; e.g. at the end opposite the open receiver face receiving radiation 110 from the heliostats. In this example, 180 degree piping bends 1500 connect neighboring heat transfer fluid channels 210 so that the heat transfer fluid exiting a channel 210 at the front of a panel 200 (the end closest to the incoming radiation 110) is returned to a neighboring channel 200 to flow a second time (hence the term "two-pass") through the panel 200 to the heat transfer fluid return header 710.

FIG. 15D provides yet another multiple-pass panel arrangement, in this case, a three-pass system. In this example, heat transfer fluid channels 210 and a panel 200 design similar to that illustrated in FIG. 5 may be envisioned. Thus, a plurality of internal heat transfer fluid channels 210 may be formed by a plurality of parallel walls 540 substantially aligned along the longitudinal axis (not shown). Heat transfer fluid may enter a heat transfer fluid supply channel 510 through at least one heat transfer fluid supply aperture 500 (one shown). The supply channel 510 then distributes the heat transfer fluid to a first set or group of parallel heat transfer fluid channels 210 to begin a first pass through the panel 200. After flowing through the heat transfer fluid channels 210, the heat transfer fluid exits into a first collection channel 1520, which collects and transfers the now "warm" heat transfer fluid to a neighboring, parallel, second set of heat transfer fluid channels 210. A baffle 1510 is installed in the collection channel 1520 to maximize the distribution of heat transfer fluid through as many of the heat transfer fluid channels of the second set as possible. The warm heat transfer fluid then begins its second pass through this middle grouping of heat transfer fluid channels 210 to be collected in a second collection channel 1520. The second collection channel 1510 also includes a baffle 1510 to maximize the distribution of heat transfer fluid through as many of the heat transfer fluid channels of the third set as possible. As the heat transfer fluid completes its third pass through the panel 200, it emerges as hot heat transfer fluid and is collected in a heat transfer fluid return channel 520 and subsequently exits the panel 200 through at least one heat transfer return aperture 530 (one shown).

The FIG. 15D design provides the additional benefits of supplying relatively cool heat transfer fluid to the locations on the panel 200 that may potentially experience the highest flux and/or absorption of radiation, and supplying relatively hot heat transfer fluid to the locations on the panel 200 that may potentially experience the lowest flux and/or absorption of radiation. Specifically, this design provides relatively cool heat transfer fluid to the portions of the panel 200 closest to the incoming radiation 110 from the heliostats, at the front open face of a receiver, and relatively hot heat transfer fluid to the portions of the panel positioned in the deepest portions of the receiver's passages and/or cavities that will only receive any remaining reflected radiation that has not yet been absorbed by the system. So, this design may provide some or all of the various advantages described above for other designs (e.g. FIGS. 15A and 15B).

Although FIG. 15D illustrates a panel 200 configured with three heating stages to provide a 3-pass arrangement, it should be appreciated that in other implementations, a panel 200 may be configured to have any number of heating stages each comprising a subset of one or more channels 610. As mentioned above, in any of the various possible implementations described herein, heat transfer fluid channels 210 may be implemented with tubes, or other structural features for example corrugated sheets with internal flow channels, or mechanically or chemically etched micro-channels.

A perfect blackbody absorbs all incoming radiation and does not reflect or transmit any radiation. Without wishing to be bound by theory, in some embodiments of the present disclosure, a receiver may be configured to operate similar to a near blackbody furnace, such that the receiver minimizes convective and radiant energy loses to the environment by reducing direct exposure of heated surfaces to the cooler ambient surroundings. Referring again to FIG. 14, the geometry of the panel modules 740 and the repeating polygonal geometry of the receiver 140 may prevent or minimize reflective losses and disrupt upward convection within the internal passages of the panel modules 740. This configuration may enable the receiver 140 to behave as a near-blackbody receiver, by absorbing greater than 95% of the incoming radiation 110 delivered by the heliostats, and minimizing thermal losses to the environment. A total receiver thermal efficiency between about 90% to about 95% may be possible for receivers operating with heat transfer fluid temperatures in excess of about 650° C. In comparison, current typical receivers lose as much as 12% of the incoming radiant energy to the environment, at considerably lower operating temperatures (e.g. ~565° C.).

A receiver may be constructed with some panels that do not include heat transfer fluid channels. For example, the ends of panel modules, at the deepest interior portions of a cavity or passage, may be constructed using a back panel lacking any kind of heat transfer fluid channel. Such panels are referred to herein as "passive" panels. In some embodiments of the present invention, passive panels may be aligned so that their internal (that is, inward-facing) surfaces are aligned with (e.g. parallel or near parallel) to the longitudinal axis of the receiver. Examples of possible passive surfaces include side panels, base panels, back panels, and top panels. Passive surfaces may overheat when exposed directly to radiation from the heliostats and/or reflected radiation. Thus, the angled portions of the panel modules shown in FIGS. 7, 9, and 10 serve the additional purpose of shielding the passive back panel from direct impingement by radiation delivered by the heliostats.

Because of the high cost of concentrating solar power plant tracking mirrors (i.e., heliostats), fully collecting and using the reflected flux provided by a heliostat field is important. Receiver thermal efficiency affects concentrating solar power plant performance, and it affects the electricity generation cost. Several measures may be taken to control thermal losses for a NBB direct s-$CO_2$ thermal receiver. In particular, controlling convection can be achieved by: a) reducing natural convection by internally isolating hot surfaces; b) reducing convection losses by stacking cavity modules vertically; c) reducing convection losses by tilting the entire cavity structure downward to induce stagnation zones through buoyancy; and d) reducing convection losses by increasing the ratio of cavity depth to cavity aperture size. With respect to controlling infrared (IR) re-radiation, noting that the IR losses may dominate over convective losses, emission loss is relatively insensitive to the passive surface optical properties, but may be minimized by reducing passive surface area (including using active rather than passive separator walls), or by avoiding exposure of passive surfaces to the environment. IR losses may be mitigated by: a) controlling absorber temperature by supplying relatively cool heat transfer fluid to regions that experience the highest flux; b) positioning the highest temperature surfaces in regions with limited direct exposure to the ambient environment, such as the deepest interior portions of the cavity; c) modifying surface emissivity via surface coatings which are weakly emissivity in the IR spectrum; and d) reducing the temperature and ambient exposure of passive walls, either through optimization of passive wall optical properties and/or by reducing the amount of radiation impinging on passive surfaces by aligning passive panels along the longitudinal axis of the receiver and/or by positioning active surfaces to shield passive surfaces from direct exposure to radiation supplied by the heliostats. With respect to reflection, the specularity of both active and passive surfaces may have a significant impact on the total thermal energy lost due to reflection of radiation. Surface optical properties, including absorptance and specularity, may be used to minimize reflective losses. High surface absorptance tends to promote capture of incident radiation by limiting the number of reflections within the cavity and thereby reduces the loss of reflected energy from a receiver. However, this must be balanced with constraints on peak flux absorption and uniformity of flux absorption along panel surfaces. Specularly reflective surface coatings provide a mirror-like finish on the absorber surfaces and thus promote reflection of incoming radiation into a direction along the longitudinal axis toward deeper regions of the cavity and away from the aperture.

As radiation enters a receiver's front face, it is both partially reflected and absorbed at panel surfaces as discussed above. Control of local absorption, radiation, and reflection can be accomplished via application of surface coatings. Highly reflective surface coatings such as ceramic materials may increase the fraction of incident flux that is reflected beyond that characteristic of the bare, unmodified absorber material. Conversely, highly absorptive surface coatings such as black paints may decrease the fraction of incident flux that is reflected below that characteristic of bare, unmodified absorber materials. Application of different surface coatings within distinct regions of the receiver may allow for high reflectance in regions with high incident energy and/or high absorptance in regions with limited incident energy, thereby producing a more uniform absorbed flux profile and surface temperature distribution, on the various receiver internal surfaces, than that produced by an unmodified absorber material of construction.

FIGS. 16A, 16B and 16C are graphs illustrating example thermal loss data, in particular illustrating the dependence of convective thermal losses on the angle of downward tilt, P, of a single cavity (16A), the radiative thermal loss from a cavity as dependent on surface emissivity and surface temperature (16B), and the dependence of a receiver's convective loss per cavity on the number of adjacent cavities in the vertical direction (16C).

Computational fluid dynamics (CFD) analysis has shown that tilting the receiver so that the open front face of the receiver and the passages face downward can effectively reduce the thermal loss by natural convection and result in a higher thermal receiver efficiency. Therefore, in some implementations, the receiver is designed to tilt relative to the ground or some other fixed reference plane so that it points downward toward the heliostat array. The creation of a high-temperature stagnation zone at the back of the receiver's cavity may further reduce natural convection. FIG. 16A summarizes these findings by relating convection losses to receiver tilt angle. A tilt angle of zero is defined in FIG. 16A as horizontal.

Because a receiver is constructed from a repeating geometry comprising multiple modules, each passage of a receiver may be increasingly thermally isolated as a buoyant flow develops across the front open face of the receiver. This effect is illustrated in FIG. 16C, which shows that the largest convective losses may occur in the bottom two rows of vertically stacked panel modules (panel #1 is the bottom positioned panel module, whereas larger panel module numbers is positioned higher up in the stack). Panel modules in this area may also have the largest temperature gradients. FIGS. 16B and 16C also indicate that the thermal efficiency may be improved by increasing the number of vertical rows of panel modules, or by increasing the amount of absorber area above the first few rows of panel modules. This can be achieved, for example, by altering the aspect ratio of the receiver such that each panel module's passage is taller than it is wide, or by decreasing each panel module's passage depth and increasing the number of panel modules stacked vertically.

In some embodiments of the present invention, a receiver 140 may include more than just one open receiver, with each receiver including a plurality of panels and/or panel modules. For example, FIG. 17 illustrates a receiver 140 that includes a first open receiver face 1700 and a second open receiver face 1710, each of which may include a plurality of panels and/or panel modules according to or similar to any of the configurations described in this disclosure. This embodiment illustrates that radiation 110 from a heliostat array may be received from at least two different directions that originate from significantly different locations.

FIG. 18 illustrates a flow chart illustrating a method 1800 of one embodiment of the present disclosure. Method 1800 may be used in conjunction with a concentrating solar power system, receiver, and/or any other element described above. The method begins at 1810 with focusing radiation from a heliostat array onto the open face of a receiver constructed from a plurality of panels and/or panel modules. The method proceeds to 1820 with supplying the receiver with a heat transfer fluid, which flows through the plurality of panels and/or panel modules. The heat transfer fluid may be at least one of supercritical $CO_2$, sodium metal, molten salt, a molten metal, and/or a fluidized gas. The method proceeds to 1830 with heating via the radiation provided by the heliostat array the heat transfer fluid within the plurality of panels and/or panel modules. The method proceeds to 1840 with transferring the energy transferred from the radiation to the heat transfer fluid to a concentrating solar power plant power block.

One advantage of utilizing s-$CO_2$ as the heat transfer fluid in some embodiments is that s-$CO_2$ may also function as the working fluid in the power block, and thus may eliminate a heat exchanger from the system design. Thus s-$CO_2$ has the potential to eliminate a significant cost from the power cycle equipment and may improve cycle efficiency by eliminating the heat transfer inefficiencies associated with transferring heat from a heat transfer fluid to a separate working fluid.

S—$CO_2$ offers other significant potential advantages. Typically, the equipment for power cycles is too large to integrate into a tower structure. However, s-$CO_2$ power cycles are highly compact and require relatively little equipment for efficient operation. In addition, s-CO2 power systems may operate with high cycle efficiencies, even at relatively small capacities. So, in some embodiments, s-CO2 power cycle equipment (excluding thermal storage and heat rejection equipment) may be positioned directly in the tower and in closer proximity to the receiver. In some embodiments, the s-CO2 power cycle equipment may be incorporated directly into the receiver structure itself.

A smaller s-CO2 power cycle size, and incorporation of its equipment directly into a receiver enclosure, may be best suited for a one-sided heliostat field (typically North-based for plants in the northern hemisphere) with relatively small heliostats. Modeling was completed for a one-sided solar field with a nominal delivered power design capacity of 100 MWt. Assuming a minimum of 90% thermal efficiency resulted in a power delivered by the heliostats to the receiver of 110 MWt, at the design basis conditions specified below in Table 1. FIG. 19 illustrates a hypothetical heliostat array (constructed from approximately 10,000 heliostats) used in combination with the concentrating solar power plant design basis summarized in Table 1 below. The heliostat array of FIG. 19 and the CSP design basis were then used to model the resultant radiation flux that would be received at an 8 meter by 8 meter receiver face. This flux is illustrated in FIG. 20.

A large number of exploratory simulations were completed to identify factors affecting receiver performance, such as energy losses to the environment such as convective and radiant losses. The results indicate the following:

- Directly illuminated passive surfaces (e.g. back wall, top and bottom walls of the cavity) are the largest contributors to energy losses.
- A more even flux profile at the receiver face may be improved by adding a few vertical bisecting panels interspersed across the width of the cavity. This may help to compartmentalize the radiation received by the receiver from the heliostats and distribute it more evenly to the outer panels of the receiver.
- The flux profile at the receiver face appears to be highly sensitive to the specified absorber and wall optical properties. The most significant optical property appears to be surface absorptivity. Secularity only appears to have only a minor impact on the uniformity of the flux profile at the receiver face.
- Surface flux profiles can be significantly improved by reducing panel absorptivity to increase the number of reflections within the cavity before absorption.
- Relatively deep receiver passages relative to passage width and height dimensions may reduce the effect of panel surface absorption properties on energy losses.

FIG. 21 summarizes other modeling results. This shows an incoming flux of radiation from the heliostats, the radiation received by an exemplary receiver. FIG. 21 also illustrates how the implementation of partially absorptive panel surfaces may increase the number of internal reflections within the receiver to maximize the absorption of the incoming radiation by the receiver's internal panels. This illustrates how some embodiments of receivers described herein may maximize their thermal efficiencies by minimizing energy losses to the environment. Based on these findings and the additional design basis of a peak flux below 500 $kW/m^2$ for the heat transfer fluid channels, an exemplary receiver for a concentrating solar power plant was designed, per some of the embodiments described in this disclosure. This exemplary design is summarized in Table 2 below.

TABLE 1

Summary of Concentrating Solar Power Plant Design Basis

| Parameter | Value | Units |
|---|---|---|
| Plant location | Daggett, CA | |
| Receiver absorbed thermal power (design) | 100 | MWt |
| Heat transfer fluid "low" temperature | 470 | C |
| Heat transfer fluid "high" temperature | 650 | C |
| Turbine inlet pressure | 25 | MPa |
| Baseline receiver face dimensions ($Q_1 \times Q_2$) | 8 × 8 | m |
| Baseline receiver tilt angle (P) | −32 | deg |
| Tower height | 150 | m |
| Reference sun position | Equinox | |
| Reference irradiation (DNI)* | 950 | $W/m^2$ |
| Heliostat size | 4 × 4 | $m^2$ |

*Where DNI refers to "direct normal irradiance", which is equal to the amount of solar radiation received per unit area by a surface perpendicular to the direction of the sun.

TABLE 2

Summary of Receiver Design Basis

| Parameter | Value | Range | Units |
|---|---|---|---|
| Cavity depth (A) | 1.5 | 1.0-2.5 | m |
| Number of horizontal panel modules (E-1) | 16 | 8-25 | — |
| Number of vertical bisecting panels (F + 2) | 3 | 2-6 | — |
| Absorber absorptivity | 60 | 30-70 | % |
| Panel surface specularity | 500 | 4-1500 | mrad |
| Cavity wall reflectivity | 85 | 70-90 | % |

TABLE 2-continued

Summary of Receiver Design Basis

| Parameter | Value | Range | Units |
|---|---|---|---|
| Absorber panel bend angle (B) | 120 | 115-155 | Deg |
| Tube outer diameter* | 1.27 | 0.5-1.5 | cm |
| Header outer diameter | 6.0 | | cm |
| Heat shield bend angle | 30 | 20-60 | Deg |

*An example tube wall thickness may range from 1 mm to 4 mm.

Referring to Table 2, absorptivity=energy absorbed/energy incident, reflectivity=energy reflected/energy incident and absorptivity is assumed to be approximately 1-reflectivity. A perfectly specular surface would reflect a ray into an exactly mirrored direction of the incident ray. Specularity is the deviation from this perfect mirror surface and is defined herein as the standard deviation of a Gaussian distribution surrounding the perfect specular direction.

Optical simulation data resulting from the Table 2 configuration are summarized in Table 3 below. Factors affecting the receiver's performance such as energy absorbed versus energy lost to the environment include the absorptivity of the receiver, peak surface flux, and flux distribution homogeneity. The absorptivity can by quantified using the metric of absorptive efficiency, which can be defined in two ways. The first considers only flux (radiation) absorbed directly by the active panels, which defines the lower limit of thermal energy that can be delivered to the heat transfer fluid. The second definition uses all radiation absorbed by the receiver, including the radiation that is absorbed by passive panels (e.g. outer cavity walls of the receiver such as the outer panels, top panel, back panel, and base panel). Because of radiant and convective heat transfer within the cavity, a portion of this energy will eventually by absorbed by active panels, and losses due to emission (re-radiation) and convection are captured within the receiver's cavity and transferred to the heat transfer fluid. Therefore, this second definition is more realistic. Both definitions, one and two, for absorptive efficiency are shown in Equations (1) and (2) below, respectively.

$$\eta_{abs,active} = \frac{\sum_{i=1}^{N_{abs}} \dot{q}_{abs,i}}{\dot{q}''_{aperture} w_{rec} h_{rec}} \quad (1)$$

$$\eta_{abs,tot} = \frac{\sum_{i=1}^{N_{surfaces}} \dot{q}_{abs,i}}{\dot{q}''_{aperture} w_{rec} h_{rec}} \quad (2)$$

A basis of comparison for flux (radiation) homogeneity could be computed based on (1) a single "design-point" heat transfer fluid channel (e.g. a tube) in the entire receiver, (2) a reference heat transfer fluid channel (e.g. a tube) within a single active panel, or (3) a reference heat transfer fluid channel within a header subsystem (e.g. a panel module). Cases (2) and (3) for calculating flux homogeneity may be justified if heat transfer fluid flow rates are controlled on a panel and/or a heat transfer fluid supply header level, which is easier to model than individual heat transfer fluid channel flow control. A flux (radiation) homogeneity metric may be defined as:

$$\chi_{flux} = \frac{1}{N_{tubes}} \sum_{i=1}^{N_{hdr}} \sum_{j=1}^{N_{tube,i}} countif \quad (3)$$

$$\left\{ \left| q_{ref,i} - \int_0^{L_i} \frac{\pi d}{2} (\dot{q}''_{top,i,j}(x) + \dot{q}''_{bottom,i,j}(x)) dx \right| \leq q_{ref,i} \cdot \kappa \right\}$$

Referring to Equation 3 in words, the metric $\chi_{flux}$ represents the fraction of all heat transfer fluid channels (e.g. tubes) in the receiver whose total absorbed radiation along the heat transfer fluid's flow path falls within a specified range κ of the reference absorbed flux $q_{ref,i}$ for the receiver heat transfer fluid flow section in question (i) (e.g. a panel, or a panel module, or an individual heat transfer fluid channel). To evaluate the radiation homogeneity metric, each heat transfer fluid flow section from i=1 . . . $N_{hdr}$ is evaluated, and the heat transfer fluid channels (e.g. tubes) j=1 . . . $N_{tube,i}$ in that flow section are counted positively towards the total if the integral of absorbed flux over the length L of the tube is at least equal to the reference absorbed energy quantity $q_{ref,i}$ multiplied by the acceptable range (1-$\kappa_i$). For this analysis, method (3) has been used for computing the reference tube. Values of $\chi_{flux}$ close to 1.0 for small values of κ are desired.

The simulation results indicated acceptable levels of flux homogeneity at a 10% threshold, meaning nearly all of the individual heat transfer fluid channels (e.g. tubes) absorb a radiant energy flux that is within 10% of the reference tube for a header section. Exemplary modeled flux profiles on two active panels are shown in FIGS. 22A and 22B, with FIG. 22A illustrating the flux profile for a vertical bisecting active panel and FIG. 22B for a horizontal active panel (e.g. from a panel module).

A flux model was also used to simulate the performance of a single design-case heat transfer fluid channel (e.g. a tube), based on a peak flux intensity on any panel surface in the receiver. The tube was discretized circumferentially and axially according to an incident flux profile, and local strain, pressure loss, and surface temperature were calculated based on the incident flux. The design basis summarized in Table 2 resulted in the predicted tube flux profile and surface temperatures shown in FIGS. 23A and 23B respectively.

TABLE 3

Optical Modeling Results

| Parameter | Value | Units |
|---|---|---|
| Absorptive efficiency lower bound ($\eta_{abs,active}$) | 96.18 ± 0.01 | % |
| Energy capture efficiency ($\eta_{abs,tot}$) | 97.64 ± 0.02 | % |
| Peak absorber surface flux | 514.0 ± 22.7 | kW/m2 |
| Average absorber surface flux | 151.7 ± 0.04 | kW/m2 |
| Peak aperture flux | 2,575 | kW/m2 |
| Average aperture flux | 1,708 | kW/m2 |
| Total solar field optical efficiency | 69.4 | % |
| Flux homogeneity ($X_{flux}$) κ = .05 | 0.701 | n/a |
| κ = .10 | 0.887 | |
| κ = .25 | 0.997 | |

Convection describes a heat loss mechanism whereby thermal energy is transported directly from the heated surfaces of the receiver to adjacent air flows in the local surrounding air space. The air may then develop a circulation pattern because of buoyant forces, and this effect may then increase the rate of heat transfer from the absorber surfaces to the adjacent air flows. Convective losses can be reduced by limiting the amount vertical surface area in contact with the adjacent air flows and by minimizing the formation of air flows that circulate in and out of a receiver. For these reasons, convective loss models were run for a number of different parameter combinations to identify sensitivities and potential design improvements for receiver designs, according to some embodiments of the present invention. This analysis established that:

1. Convection losses may be significantly reduced by stacking cavity modules vertically.
2. Convection losses may be reduced by tilting the cavity downward.
3. Convective losses may be adequately simulated without consideration of the panel module bend angle and the angled portions of panel modules located towards the back of the receiver cavity.

FIGS. 24A and 24B show simulation results for one half of a symmetrically-split receiver geometry, the figures illustrating both the air temperature profile in degrees Kelvin and the wall heat flux (thermal loss) in W/m² respectively. Specifically these figures show a receiver 140 constructed using a single vertical stack of eight panel modules 740 (with no angled portion), a top panel 930, a base panel 910, and a back panel 920. Together, these elements form nine vertically stacked passages 350. One potential benefit of arranging the receiver with vertically-stacked passages is that each higher passage may increasingly thermally isolate the upper passages from the lower passages due to the development of buoyant flow. This is apparent in FIGS. 24A and 24B, which illustrate the effect of temperature differences driving heat transfer, by the presence of the largest temperature gradients in the first and second passages at the bottom of the receiver.

FIGS. 24A and 24B show that the energy losses to the environment can be reduced by increasing the number of vertically stacked panel modules, or by increasing the amount of absorber area located above the first few lowest panel modules. This can be achieved by altering the receiver aspect ratio Q such that the receiver's open receiving face is taller than it is wide, or by decreasing the cavity depth and passage height, and increasing the number of panel modules stacked vertically.

Thermal modeling has shown that another design strategy for reducing convective energy losses to air flows adjacent to the receiver is to angle the receiver's longitudinal axis and its front receiving face downwards towards the heliostats. This approach may take advantage of the heated air's buoyancy, which creates stagnant zones near the back of each passage. FIGS. 25A and 25B shows the temperature profile (in degrees Kelvin) for two receiver orientations, horizontal and angled at 45 degrees relative to the ground, respectively. In this example a receiver 140 is constructed of four vertically stacked panel modules 740 (with no angled portion), a top panel 930, a base panel 910, and a back panel 920. Together, these elements form five vertically stacked passages 350.

All configurations modeled above are for straight panel modules that lack a panel module bend angle and a corresponding angled portion of panels positioned towards the deepest region of the receiver's cavity. FIG. 26 accounts for this feature by summarizing simulated air temperature profiles (in degrees Kelvin) for panel modules constructed with approximately one-third of their combined horizontal length angled with a panel module bend angle of about 145 degrees. In this example a receiver 140 is constructed of four vertically stacked panel modules 740 (with angled portions), a top panel 930, a base panel 910, and a back panel 920. Together, these elements form five vertically stacked passages 350. Table 4 compares modeled convective loss estimates from individual straight panel modules versus panel modules that include both straight and angled portions.

TABLE 4

Comparison of Straight Panel Modules vs. Panels Including Angled Portions

| | Convective loss (kW) | |
| --- | --- | --- |
| Segment | Straight absorbers | Bent absorbers |
| 1 | 275 | 260 |
| 2 | 180 | 213 |
| 3 | 123 | 129 |
| 4 | 103 | 103 |
| 5 | 112 | 115 |

Total convective losses from the two configurations were nearly identical at 0.80 MW and 0.82 MW (1.20 MW and 1.23 MW when extrapolated to 8 vertical panels), just straight panel modules and modules including bent or angled portions respectively. FIGS. 24A and 24B indicate that convective losses may originate predominantly from the front region of each passage and thus, as expected, alteration of the geometric configuration at the back of the cavity is probably of minimal importance regarding convective losses.

In absolute terms, the convective loss model predicts a total convective loss of 1.07-1.28 MWt depending on passive panel surface temperatures, and a further reduction of convection loss to 0.74 MWt for a receiver tilted 45° downwards towards the heliostat array.

Emissive (e.g. radiant) energy losses from a receiver to the surrounding environment typically arise from temperature differences between surfaces of the receiver and surfaces located in the surrounding environment. As temperature gradients increase, natural infrared radiant heat exchange between emitting surfaces becomes more pronounced. Therefore, temperature gradients for some receiver embodiments presented herein may potentially lead to energy losses as high as 5-10% of the total energy delivered to the receiver by the heliostats. Radiant losses from the receiver may be reduced by orienting the receiver's hot surfaces such that they are not directly exposed to cooler ambient "surfaces". Receiver designs that take this into account may significantly mitigates radiant energy losses, in particular internal geometry receiver designs. Radiation emitted by a hot surface has two potential fates; it can either strike another internal surface and be absorbed, or it may follow a path out of the receiver to the outside environment where it is lost.

To understand radiant heat losses for some embodiments of the receivers described herein, a radiant heat loss model was developed and used to evaluate scenarios that considered variations in design parameters, optical properties and surface temperatures. FIG. 27 illustrates the predicted emissive losses as a function of surface temperature and surface emissivity. All active and passive surfaces in FIG. 27 were treated as diffusely reflective. Solid lines represent emission losses calculated with straight tubes, whereas dashed lines represent emission losses with panel module bend angles of about 145°. These angled portions may block the "line of sight" between the passive back wall used in this example, and receiver's front face. With a back wall passive surface temperature of about 1300K, radiant energy losses ranged from about 3.2 MW to about 4.0 MW, with more than 80% of the radiant energy losses originating from the active surfaces. The addition of the angled portions to the panel modules, positioned towards the back interior of the receiver cavity, shielded the back panel from the receiver's front face and resulting in lower radiant losses to the environment. However, it was also noted that the positive effect of the angled portions of the panel modules diminishes as the passive panel surface temperatures approaches the active panel surface temperatures. Radiant losses were shown to be relatively insensitive to surface emissivity for any passive surface temperature less than 1300K, increasing by less than 0.5 MW as the surface emissivity increases from 0.05 to 0.5.

FIGS. 28A and 28B show the sensitivity of radiant energy losses from an exemplary receiver to design parameters including the number of horizontal absorber panels, number of vertical separator panels, and absorber specularity with a conservative estimate of passive surface temperature (1300K), for surface emissivities of 0.1 and 0.5 respectively. Radiant losses with perfectly specular reflection were, on average, 10% higher than those with diffuse reflection. Just as specular reflection may enhance transfer of incoming solar radiation to the back sections of a receiver's passages, it may also enhance transport of energy emitted as radiant energy in the back regions of the cavity towards the receiver's open front face where the energy can be lost to the environment. FIGS. 28A and 28B reveal a slight preference for a larger number of panel modules and vertical bisecting panels. The use of more panel modules increases the receiver's total surface area, but may also advantageously reduce the likelihood of radiation emitted towards the back portions of receiver passages from reaching the receiver's front face to be lost to the outside environment. The weak sensitivity to the number of panel modules shown in FIGS. 28A and 28B potentially arises from the combination of these two competing effects. Shielding passive surfaces from the receiver's front face becomes less important when passive panels are highly reflective (and correspondingly weakly emissive), and thus radiant losses are very insensitive to the panel module.

FIG. 29 illustrates another feature of an exemplary receiver design, namely the ability to reduce radiant losses from all but the front-most portion of each panel and/or panel module. Radiant losses from the receiver decreased to less than 30% of the total radiant energy emitted by the receiver surfaces within the first meter of receiver passage depth, for the case of eight panel modules. Only 9% (8 stacked panel modules) or 17% (4 stacked panel modules) of the energy emitted by the reciever's passive back panel was lost under these conditions. While the curves shown in FIGS. 29 and 30 were evaluated with a uniform 1000K panel module temperature, temperature profiles under actual operation can be expected to increase along the cavity and/or passage depth, starting with a relatively cold inlet temperature near the receiver's front face, as shown in FIGS. 23A and 23B above. Thus, providing cooler surface temperatures towards the receiver's front face may significantly improve the receiver's thermal efficiency, even beyond what is shown in FIGS. 27, 28A, and 28B.

The radiant losses presented here were calculated using rows of individual heat transfer fluid channels (e.g. tubes) represented as solid panels. FIG. 31 quantifies the relative error incurred by these assumptions for panels comprised of arrays of tubes positioned with uniform tube spacing of 0.25 cm, 1 cm, and 5 cm. Simulations with "solid" (no spacing) panels can lead to underestimating radiant losses. However, maintaining tube spacing at or below about 1 cm, appears to maintain radiant losses to the environment to less than 5% of the total radiant energy emitted in this exemplary receiver, or to at most about 0.25 MW.

Taken together, these results provide guidelines for the following exemplary receiver design. The receiver may be constructed to form a front open face that is approximately 8 meters wide by 8 meters tall and contains two vertical stacks of 16 panel modules, the stacks separated by a single vertical bisecting panel. The receiver also includes a base panel, a top panel, two side panels, and a back panel. The configuration of panels forms two stacks of 17 passages per stack for receiving radiation from the heliostat array. Each channel includes nine panels which are shared between adjacent channels. Four panels are arranged to form a rectangular-shaped passage whose central longitudinal axis is aligned normal to the front face of the receiver. Four additional panels are arranged to form a rectangular-extension to each passage, whose central axis is angled downward relative to the longitudinal axis of the first portion of the passage. The angle, the panel module bend angle, between the longitudinal axis and central axis is approximately 120°. The back panel, parallel with the receiver's open face, closes the passage. This geometry is generally illustrated in FIG. 10. In the preferred embodiment, the passage width, $Q_1/F$, is about 4 meters, the module height, $Q_2/E$, is about 0.5 meters, and the total module depth A is about 1.5 meters. The depth of the horizontal section of panel (normal to the receiver's front face) is about 1.21 meters, while the depth of the angled portion is about 0.58 meters. The height and width of the back panel is approximately equal to the dimensions of the receivers open face (e.g. about 8 meters by 8 meters). Each panel module is constructed from one or more panels. Each panel is constructed from of a plurality of heat transfer fluid channels, cylindrical tubes, with outer tube diameters equal to about 0.0127 meters, each tube with a wall thickness of about 0.002 meters. The absorber tubes are constructed from Haynes 230 alloy, and are welded to their respective heat transfer fluid distribution piping using either welded or seamless processes.

The tubes are assembled into panels using standard tube-header joining technique. Namely, each tube is bent near to the end of the panel, and alternating adjacent tubes are bent up or down to provide spacing for welding at the header. Tubes are then welded into the flow source or flow return header as illustrated in FIG. 8. Each tube is welded to both a flow source and a flow return header. Headers consist of cylindrical tubing with outer diameter of 0.06 m and wall thickness of 0.01 m and are composed of Haynes 230 alloy.

Headers near the aperture are protected from direct exposure to incoming radiation from the heliostats utilizing a radiation shield system as illustrated in FIG. 11B. The radiation shield is composed of two aluminum plates connected in a "V" shape with the angle between the two surfaces being approximately 30°. Channels are positioned in the aluminum plates, the channels constructed of copper and/or aluminum tubing with outer diameters of ~⅜ inches and rated for low-pressure application (e.g. less than 14.7 psia). Tubes are spaced at about ½ inches centerline-to-centerline. The tubes contain a water-glycol mixture that maintains the heat shield device below about 150° during operation. A thin reflective plate is fastened to the aluminum cooling plates on the exposed surface. The reflective plate consists of a polished stainless steel substrate and is coated with a thin layer of nickel, a thin layer of silver, and a thin protective coating layer consisting of silicon dioxide that has been deposited using a physical vapor deposition process. The water-glycol coolant flows through the heat shield assembly first in the tubes nearest the pinnacle of the "V"

shape, then is routed to return back to a collection point using the tubes near the back of the "V" shape.

Heat transfer fluid in the form of pressurized carbon dioxide in a supercritical state (s-$CO_2$) flows through the tubes and headers of the receiver's panels and builds in temperature as solar flux is absorbed by the panels and transferred to the s-$CO_2$. The s-$CO_2$ enters each panel module near the horizontal mid-point of the receiver and flows from the back (e.g. the back panel) of each module to the front of the receiver (e.g. the receiver's open front face). Flow is initially provided through a supply header to one quarter of the tubes in a module. The s-$CO_2$ passes in equal proportion through each tube initially supplied and is collected in the header near the aperture. The flow then moves along the axis of the return header and is distributed back into a quarter of the tubes that are adjacent to the initially supplied tubes. Flow proceeds in equal proportion to the back of the receiver, where the process is repeated. Each module therefore consists of an alternating "serpentine" flow pattern where fluid moves from the quarter of the module near the centerline of the receiver to the outermost quarter near the periphery of the receiver. At the final collection point, the fluid has been heated on average to a temperature of 650° C. and is then mixed in the final collection header and routed to a piping network that supplies fluid to the power block. Of the two modules in the horizontal direction, the flow pattern is mirrored such that flow in both enters near the midpoint of the receiver and proceeds outward.

The tubes used to construct the panels and panel modules utilize a surface coating with absorptivity of 60%. The surface coating is composed of a ceramic paint or surface treatment that is stable at high temperature. Reflections off of the coated surface are nearly diffuse with a specularity of 500 mrad. All surfaces in the receiver share these optical properties with the exception of the back wall, which consists of a ceramic tiling that does not transfer heat to the s-$CO_2$ heat transfer fluid. The ceramic tiling has a surface reflectivity of 85% and is diffusely reflective (specularity >1500 mrad).

It is noted that there are alternative ways of implementing the embodiments disclosed herein. While a number of exemplary aspects and embodiments have been discussed above, those of skill in the art will recognize certain modifications, permutations, additions and sub combinations thereof. Accordingly, the present embodiments are to be considered as illustrative and not restrictive. Furthermore, the claims are not to be limited to the details given herein, and are entitled their full scope and equivalents thereof.

What is claimed is:

1. A receiver comprising:
    a first tube comprising a first outer surface;
    a second tube comprising a second outer surface;
    a third tube comprising a third outer surface; and
    a fourth tube comprising a fourth outer surface, wherein:
    a first portion of the first tube, a first portion of the second tube, a first portion of the third tube, and a first portion of the fourth tube are aligned substantially parallel to an axis,
    the first tube and the second tube are adjacent to each other such that the first outer surface and the second outer surface form a first planar structure,
    the third tube and the fourth tube are adjacent to each other such that the third outer surface and the fourth outer surface form a second planar structure,
    each tube is configured to receive and discharge a heat transfer fluid,
    the first tube further comprises a bend separating the first portion of the first tube from a second portion of the first tube, where the bend is at an angle B relative to the axis, and
    the second tube further comprises a bend separating the first portion of the second tube from a second portion of the second tube, where the bend of the second tube is at the angle.

2. The receiver of claim 1, wherein the angle B is between 90 degrees and 155 degrees.

3. The receiver of claim 1, wherein the first planar structure and the second planar structure are separated by a distance D to form a cavity between the first planar structure and the second planar structure.

4. The receiver of claim 3, wherein the distance D is between 6 inches and 6 feet.

5. The receiver of claim 3, wherein:
    relative to the first axis, a first proximal edge of the first planar structure is aligned with a second proximal edge of the second planar structure, and
    an opening into the cavity is formed by at least the first proximal edge and the second proximal edge.

6. The receiver of claim 1, wherein:
    the third tube further comprises a bend separating the first portion of the third tube from a second portion of the third tube, where the bend of the third tube is at the angle, and
    the fourth tube further comprises a bend separating the first portion of the fourth tube from a second portion of the fourth tube, where the bend of the fourth tube is at the angle.

7. The receiver of claim 1 wherein:
    the third tube further comprises a second outlet,
    the fourth tube further comprises a second inlet, and
    the second outlet and the second inlet are fluidly connected by a bend.

8. The receiver of claim 7, wherein the first tube and the fourth tube are fluidly connected.

9. The receiver of claim 1, wherein the heat transfer fluid comprises supercritical carbon dioxide.

10. The receiver of claim 1, wherein at least one of the first planar structure or the second planar structure is configured to receive radiation such that at least a fraction of the radiation transfers heat to the heat transfer fluid.

* * * * *